(12) United States Patent
Hart

(10) Patent No.: US 8,460,111 B2
(45) Date of Patent: Jun. 11, 2013

(54) METHODS AND APPARATUS FOR DETERMINING DISTANCES TO SELECTED TARGETS ON A GOLF COURSE USING A WIRELESS COMMUNICATION DEVICE

(75) Inventor: John D. Hart, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 749 days.

(21) Appl. No.: 12/142,015

(22) Filed: Jun. 19, 2008

(65) Prior Publication Data

US 2009/0082139 A1 Mar. 26, 2009

Related U.S. Application Data

(60) Provisional application No. 60/945,086, filed on Jun. 19, 2007.

(51) Int. Cl.
*A63F 9/24* (2006.01)
(52) U.S. Cl.
USPC .............................................. 463/42; 473/131
(58) Field of Classification Search
USPC ............................................. 463/42; 473/131
See application file for complete search history.

(56) References Cited

U.S. PATENT DOCUMENTS

| 6,278,402 | B1 | 8/2001 | Pippin |
| 6,456,938 | B1 * | 9/2002 | Barnard ........................ 701/454 |
| 6,496,141 | B2 * | 12/2002 | Pippin ..................... 342/357.34 |
| 6,525,690 | B2 | 2/2003 | Rudow et al. |
| 2002/0044086 | A1 * | 4/2002 | Boman .................... 342/357.08 |
| 2002/0082122 | A1 | 6/2002 | Pippin et al. |
| 2003/0036848 | A1 * | 2/2003 | Sheha et al. .................. 701/209 |
| 2004/0147329 | A1 * | 7/2004 | Meadows et al. ............. 473/131 |
| 2006/0189386 | A1 * | 8/2006 | Rosenberg ....................... 463/37 |
| 2006/0238347 | A1 * | 10/2006 | Parkinson et al. ......... 340/572.4 |
| 2007/0093257 | A1 * | 4/2007 | McDougall et al. ....... 455/456.1 |
| 2010/0160057 | A1 * | 6/2010 | Willett .......................... 473/176 |

FOREIGN PATENT DOCUMENTS

| WO | WO0197926 A1 | 12/2001 |
| WO | WO2007038711 A2 | 4/2007 |

OTHER PUBLICATIONS

International Search Report and Written Opinion—PCT/US08/067567—International Search Authority, European Patent Office, Oct. 1, 2008.
United States Patent and Trademark Office, Patent Bar Exam, questions 29-32, Oct. 17, 2001.

* cited by examiner

*Primary Examiner* — Omkar Deodhar
(74) *Attorney, Agent, or Firm* — Fariba Yadegar-Bandari

(57) ABSTRACT

Devices, apparatus, systems, methods, and computer program products are provided for determining distances to targets, such as targets on a golf course using a wireless communication device. Wireless device implementation allows for existing devices to be configured with the requisite application to provide for golf course distance measuring capabilities according to the present aspects. Present aspects provide for accurate and automated determination of the distance to the target, such as a transitory target like a golf cup. Current aspects may utilize communication network-based and/or satellite based systems to determine the distance to the desired target and provide for automatic position/location fixes to be performed when a target, such as a golf cup, is moved to a new location.

124 Claims, 13 Drawing Sheets

METHODS AND APPARATUS FOR DETERMINING DISTANCES TO SELECTED TARGETS ON A GOLF COURSE USING A WIRELESS COMMUNICATION DEVICE

CLAIM OF PRIORITY UNDER 35 U.S.C. §119

The present Application for Patent claims priority to Provisional Application No. 60/945,086, entitled "METHODS AND APPARATUS FOR DETERMINING DISTANCES TO SELECTED TARGETS ON A GOLF COURSE USING A WIRELESS COMMUNICATION DEVICE", filed Jun. 19, 2007, and assigned to the assignee hereof and hereby expressly incorporated by reference herein.

BACKGROUND

The described aspects relate to a wireless communication device, and more particularly, to apparatus and methods of determining distances to a golf cup and related targets on a golf course using a wireless communication device.

Avid golfers are aware of the importance of knowing, as accurately as possible, the distance between the golf ball and the golf cup or hole located on the green. In addition, golfers also desire to know the distance between the golf ball and hazards on the golf course, such as water hazards, bunkers, and the like. Knowing these distances allows the golfer to make the proper golf club selection and to choose a strategy for addressing and hitting the ball based on the current lie of the ball, weather/wind conditions, hole location on the green and the like.

A golfer or caddie will use yardage books that include yardage calculations, especially during a competitive tournament. The yardage calculations are relied upon to determine the distance between a ball currently being played and the golf cup or a hazard on the hole being played. Yardage books provide an advantage over guessing the distance based on a visual inspection. However, the yardage books require familiarity with the course being played, in that, the book is prepared prior to the round of golf. Such preparation is inconvenient and, for the recreational golfer, often times inconceivable. In other instances, yardage books may be purchased for a specified course, through the pro shop; however, these books tend to be costly. In addition, yardage books require measuring distances from designated landmarks on a specific hole and making on-the-spot calculations to determine the distance. Additionally, approximations are made for location of the tee boxes and/or the location of the golf cup on the green, both of which may vary on a day-to-day basis. Thus, not only are the determinations prone to human error, the determinations also tend to be very time consuming; exasperating the slow-play problem that plagues many golf courses and/or tournaments.

The recreational golfer will rely on markings on the golf course to determine distance. For example, many courses mark the sprinkler heads with the yardage to the green or post a marker at the 100-, 150-, and/or 200-yard position from the center of the green. However, these markers pose the same problems as the yardage books. They require human interaction, walking off footpaces to the marker to determine an actual distance, which is prone to error and very time consuming. Additionally, the marked distance is to the center of the green and, therefore, does not take into account the actual position of the golf cup on the green.

Monocular-type devices that employ laser rangefinders can be used to enable visual determination of the distance. However, the flagstick is, in most instances, required to be in the hole in order to take a reading, thus prohibiting use while the foursome in front of the golfer is using the green, making use of the device inefficient in terms of time management. Additionally, preferably, the golfer has line-of-sight to the flagstick or another target, such as a bunker or body of water, in order to take a reading. However, in many instances on a golf course, a golfer will not have a line-of-sight to the flagstick or target, such as in the instance of a "blind-shot," thus making such devices unusable.

Current distance measuring devices and course markings are relegated to determining distance to the center of the golf green as opposed to the actual location of the golf cup. However, these measurements to the center of the green may be wrought with inaccuracy. Golf greens may not have a true "center," and the distance from the "center" to the periphery of the green may be significant. For example, anything over a few yards may be deemed significant in the eyes of a golfer trying to assess a golf shot. Further, golf cups are transitory in nature, and are rarely placed in the exact center of a green. More often, the golf cup will be placed closer to the periphery of the green, nearer a hazard, to make the hole more challenging to the golfers.

With regard to the transitory nature of the golf cup, a greens keeper will change the location of the golf cup each day or every few days. This is done on two accounts: to lessen foot traffic around the cup and, thus, insure green integrity, and to make the hole more challenging. For example, in a four round golf tournament, the cup location is changed after every round to maximize the challenge presented to the golfers. As such, inaccuracies in determining the distance to a cup may be the difference in making a shot that lands within inches of the golf cup versus a shot that lands in a water hazard or bunker.

Further, for example, Global Positioning System (GPS) devices have been employed, either in handheld devices or incorporated in golf carts, to determine distances on a golf course. GPS devices use satellites to determine a position of the device based on triangulation type calculation. However, GPS devices can be limited to providing only the distance to the front, back, and center of the green as opposed to the actual location of the golf cup. Thus, such devices still require the golfer to make an interpolation and/or calculation as to the exact location of the golf cup on the green.

The use of golf cart based GPS-type systems by golf courses is very limited, due to the high overhead costs incurred in either retrofitting existing golf carts or purchasing entirely new and expensive golf carts. Additionally, golf cart based systems require the golf cart to be located proximate to the golf ball and, thus, in some situations, such as when the course prohibits carts leaving the cart paths due to wet ground or when the ball is located somewhere a cart is incapable of going, it would be impossible to receive accurate distance measurements.

A problem with current handheld GPS-type devices is that golf course information, such as the course layout, is preloaded on the device prior to playing a round of golf. Preloading requires the device to be docked or otherwise connected to a computer to download the requisite course information. If the golfer forgets to preload the course information or does not have ready access to a networked computer prior to playing a round, the GPS device is rendered useless for that particular round of golf.

Additionally, many of the handheld devices are standalone devices specifically dedicated to providing golf course information. Such devices are generally expensive in a number of respects. For example, such devices require the golfer to purchase the standalone device and further require the golfer to purchase and load the device with the proper information prior to the round of golf.

Therefore, a need exists for an improved system for measuring the distance on a golf course, specifically the distance from the current ball/shot location to the golf cup.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Present aspects provide for methods, devices, systems, and computer program products for determining the distance to a target, such as a golf cup/hole on a golf course, and optionally to related targets on a golf course. Present aspects provide for accurate and automated determination of the distance to the target, e.g., golf cup, and optionally to related targets. Current aspects utilize a geographic positioning system, such as Global Positioning System (GPS) and/or communication network-based systems, to determine the distance to the target, e.g., golf cup. Further, when the target is moved according to a schedule, such as the golf cup being moved about the green on a regularly scheduled basis, present aspects provide for the system to automatically record the new location of the target, such as the golf cup, without requiring the greens keeper or any other golf course employee to perform a required action related to taking a location reading. In this regard, problems related to human error, such as the groundskeeper/employee failing to take a location reading on one or more holes or failing to properly use the equipment needed to take the location reading, can be minimized.

Additionally, present aspects provide for golf course information, such as the location of the golf cup, related targets, course layout, and the like, to be communicated via a wireless network, such as a cellular network, to a wireless device, such as a cellular telephone or the like. In this regard, the golfer/user may obtain golf course information at any point in time prior to or during a round of golf, obviating the need to pre-load golf course information via a wired connection to a communication network. In some aspects, the golf course information may be communicated automatically when the golfer/user is on or in the near vicinity of the course. An additional benefit of one or more of the present aspects is that the system can be configured to operate on an existing wireless device, such as a cellular telephone, thereby eliminating the need for the golfer/user to purchase or carry an additional device or for the GPS system to be installed in golf carts.

In one aspect, a method for determining distance to a golf cup on a golf course is provided. The method includes obtaining a wireless device geographic location and a golf cup geographic location related to the one of the plurality of golf cups. The golf cup geographic location is determined based on occurrence of an automatic event, such as a predetermined event or the like. The method further includes obtaining a distance to the golf cup based on the wireless device geographic location and the golf cup geographic location and presenting the distance to the golf cup on the wireless device.

In one optional aspect of the method, the automatic event may include sensing a predetermined level of motion in the golf cup or the occurrence of a predetermined set time. In another aspect, the automatic event may be a predetermined time of day, which, upon occurrence, triggers location determination at the golf cup. The predetermined time of day will generally occur after the normal time of day at which the golf cups are moved to new locations on the golf hole green.

In yet another aspect of the method, the automatic event may be receipt of a remote trigger. For example, a network device/Position Determining Entity (PDE) may receive from a wireless device a trigger to perform location determination of a golf cup. In some aspects, the remote trigger is based on a user input to an input mechanism on the wireless device for requesting a distance to the golf cup measurement. In such aspects, the golf cup location determination may coincide with a wireless device location determination, such that both location determinations occur at substantially the same point in time. By conducting both the wireless device and the golf cup location determinations at substantially the same point in time inaccuracies in the location due to satellite positioning are viewed as being generally equivalent for each location determination.

In some aspects of the method, obtaining the wireless device geographic location and the golf cup geographic location and subsequent obtaining of the distance to the golf cup is automatic based on initiation of golf course distance measuring application. In other aspects of the method, obtaining the wireless device geographic location and the golf cup geographic location and subsequent obtaining of the distance to the golf cup is based on receiving a request, such as a user input, for the application to obtain a distance to the golf cup.

Additionally, in one aspect the method may automatically receive, at a wireless device, the golf course information. Automatic reception of the golf course information may be achieved by the system recognizing, via GPS or another location determination mechanism, that the wireless device is at or in the vicinity of a golf course that has been configured to implement the system of the present aspects. In addition, the system may provide for automatic recognition of the movement of the wireless device about the golf course, so that the system can provide distance to the cup and target information for any hole on the course without the need for user input.

In another optional aspect of the method, receiving the golf course information may further include receiving golf course information that includes the golf cup geographic location for the plurality of golf cups on the golf course and, thus, obtaining a golf cup geographic location may further include obtaining the golf course location from the golf course information. In alternate optional aspects of the method, obtaining the golf cup geographic location further comprises obtaining the golf cup geographic location by wirelessly communicating with a network device that stores current golf cup geographic location, after the request for distance is initiated.

An additional optional aspect of the method provides for executing a Geographic Positioning System (GPS)-based location-determination mode, such as Mobile Station (MS)-Based mode, Mobile Station (MS)-Assisted mode, and Standalone mode or a Differential Global Positioning System (DGPS)-based location-determination mode to obtain the wireless device geographic location. Furthermore, the method may provide for executing a network-based location determination mode, such as Advanced Forward Link Trilateration (AFLT), Enhanced-Observed Time Difference (E-OTD) or the like.

In certain aspects of the method, obtaining a distance to the golf cup based on the wireless device geographic location and the golf cup geographic location further includes determining, at the wireless device, the distance to the golf cup based on the wireless device geographic location and the golf cup geographic location and, in alternate aspects, obtaining a distance to the golf cup further includes communicating with a wireless network device to obtain the distance to the cup.

In one optional aspect of the method, presenting the distance on the wireless device further includes presenting the distance on an output mechanism chosen from the group of output mechanisms consisting of a display, a speaker, and a Personal Area Network (PAN) transceiver, such as a Bluetooth® transceiver.

In one specific alternate aspect of the method presenting the distance to the golf cup may include presenting a first display that includes at least distance to the golf cup and a golf course hole number associated with the golf cup and presenting a second display that includes at least an overview of a golf course hole layout associated with the golf cup and distance to the one or more predetermined golf course targets. In other aspects, the method may include presenting additional displays of golf course information, such as a golf course green overview that provides distance to the golf cup and, in some aspects, gradient markings for the green.

Additionally, the method may include obtaining a geographic location of one or more predetermined golf course targets, wherein the golf course targets are associated with the one of the plurality of golf cups. Golf course targets can include area markings for hazards, such as water hazards, bunkers, and the like and area markings for the greens. The geographic location of the one or more predetermined golf course targets may be obtained from the golf course information and distance to the one predetermined golf course targets may be obtained based on the wireless device geographic location and the geographic location of the one or more predetermined golf course targets. Once the distance to any predetermined golf course target is obtained, the distance may be presented on the wireless device.

In alternate aspects of the method, additional information related to golf course, impending golf shot, and the environment may be obtained and presented to the user. For example, the elevation gradient between the wireless device and the golf cup may be obtained and presented in conjunction with presentation of the distance to the golf cup. Additionally, environmental conditions such as current temperature, current wind speed, current wind direction, current humidity, and the like may be obtained and presented on the wireless device.

In another optional aspect of the method, a directional vector may be determined and displayed on the wireless device. The directional vector indicates the direction from the wireless device to the golf cup and, as such, is instrumental if the golfer does not currently have line-of-sight to the golf hole. Further, the directional vector may be represented on the display in combination with additional target information, such as trees, bunkers, water hazards, etc., in order to assist the golfer in lining up the shot relative to other landmarks and/or to inform or assist the golfer with respect to targets along the shot line represented by the directional vector.

In yet another alternate aspect of the method, the obtained distance to the hole, as well as, alternate parameters, such as elevation, environmentals, and the like, may be communicated, wirelessly, to a remote assistance service, such as a remote golfer professional service, and, in response, receiving golf swing advice or a golf tip from the remote assistance service. Additionally, the golfer may use the wireless device's video camera feature to capture video of the golfer's swing and communicate the golf video swing to the remote assistance service.

An alternate aspect is defined by at least one processor configured for determining golf cup distance on a golf course. The processor includes a first module for obtaining a wireless device geographic location and a golf cup geographic location related to one of a plurality of golf cups. The golf cup geographic location is determined based on occurrence of an automatic event, such as a predetermined event or the like. The processor additionally includes a second module for obtaining a distance to the golf cup based on the wireless device geographic location and the golf cup geographic location and a third module for presenting the distance to the golf cup on the wireless device.

A computer program product that includes a computer-readable medium provides for another alternate aspect. The medium includes at least one instruction for causing a computer to obtain a wireless device geographic location and a golf cup geographic location related to the one of the plurality of golf cups. The golf cup geographic location is determined based on occurrence of an automatic event, such as a predetermined event or the like. The medium also includes at least one instruction for causing a computer to obtain a distance to the golf cup based on the wireless device geographic location and the golf cup geographic location and at least one instruction for causing a computer present the distance to the golf cup on the wireless device.

A wireless communication device defines a further related aspect. The device includes means for obtaining a wireless device geographic location and a golf cup geographic location related to one of a plurality of golf cups. The golf cup geographic location is determined based on occurrence of an automatic event, such as a predetermined event or the like. The device also includes means for obtaining a distance to the golf cup based on the wireless device geographic location and the golf cup geographic location and means for presenting the distance to the golf cup on the wireless device.

A wireless device that includes a computer platform including at least one processor and a memory provides for another related aspect. The wireless device additionally includes a golf course distance measuring application that is stored in the memory and executable by the at least one processor. The application is operable to obtain a wireless device geographic location and a golf cup geographic location related to the one of the plurality of golf cups, obtain a distance to the golf cup based on the wireless device geographic location and the golf cup geographic location, and present the distance to the golf cup on the wireless device.

In accordance with the wireless device aspect, the golf cup geographic location is determined based on occurrence of an automatic event, such as a predetermined event or the like. In one aspect, the event may be the sensing of motion in one of the plurality of golf cups associated with the golf cup. Alternatively, the event may be the occurrence of a predetermined time of day for initiating the determination of the golf cup location, such as a time of day that occurs after the movement of the golf cup on the golf course green. In another aspect, the event may be receipt of a remote trigger, which may prompt location determination at the golf cup to occur at substantially the same point in time as location determination at the wireless device.

In one aspect of the device, the golf course distance measuring application is further operable to automatically obtain the wireless device geographic location and the golf cup geographic location and, subsequently, the distance to the golf cup based on initiation of golf course distance measuring application. In other aspects of the device, the golf course distance measuring application is further operable to receive a request, such as a user input, for the application to obtain a distance to the golf cup prior to obtaining the wireless device geographic location and the golf cup geographic location.

Another aspect is defined by a method for obtaining current golf cup geographic location at a network server. The method includes receiving, from a location-determining entity, an initial golf cup geographic location for a golf cup at a predetermined golf course and storing, in network memory, the initial golf cup geographic location as a current golf cup location. The method additionally includes receiving, from the location-determining entity, an update to the initial golf cup geographic location based on an occurrence of an automatic event, such as a predetermined event or the like, and storing, in memory, the update to the golf cup geographic location as the current golf cup location.

In alternate aspects of the method, the automatic event may include, but is not limited to, sensing a predetermined level of motion in at least one the golf cup, occurrence of a predetermined time of day, such as a set time preceding the movement of the golf cup to a new location on the golf course green and/or receipt of a remote trigger that may prompt location determination at the golf cup and at the wireless device to occur at substantially the same point in time.

The method may additionally include communicating, wirelessly, upon request, the current golf cup location to a wireless device. The golf cup location may be communicated to the wireless device in response to a request for information related to the golf course or in response to initiation of a golf cup distance request by the wireless device.

In one specific aspect of the method, the location-determining entity determines the initial golf cup location by executing a Mobile Station (MS)-Assisted Global Positioning System (GPS)-based location-determination routine or a Differential Global Positioning System (DGPS)-based location-determination routine. In other aspects of the method, the location-determining entity determines the initial golf cup location by executing a network-based routine, such as Advanced Forward Link Trilateration (AFLT), Enhanced-Observed Time Difference (E-OTD) or the like. In some aspects, the location-determining entity may be external and remote from the network server and in other aspects, the location-determining entity may be internal to the network server.

The method may further include receiving a current wireless device geographic location from a wireless device, determining a distance to the golf cup based on the current wireless device geographic location and the current golf cup geographic location and communicating the distance to the cup to the wireless device.

In an alternate aspect, the method may include receiving, from a location-determining entity, geographic locations for one or more predetermined targets associated with the golf cup, storing, in the memory, the geographic locations for the one or more predetermined targets and communicating, wirelessly, the geographic location of the targets to the wireless device. Alternatively, the method may further include receiving a current wireless device geographic location from a wireless device, determining a distance to the one or more predetermined targets based on the current wireless device geographic location and the geographic location of the one or more targets and communicating the distance to the one or more targets to the wireless device. Predetermined targets may include golf course greens, water hazards, bunkers, and the like.

A related aspect is defined by at least one processor configured for obtaining current golf course cup geographic location at a network server. The processor includes a first module for receiving, from a location-determining entity, an initial golf cup geographic location for a golf cup at a predetermined golf course and a second module for storing, in network memory, the initial golf cup geographic location as a current golf cup location. The processor additionally includes a third module for receiving, from the location-determining entity, an update to the initial golf cup geographic location based on an occurrence of an automatic event, such as a predetermined event or the like and a fourth module for storing, in network memory, the update to the golf cup geographic location as the current golf cup location.

A computer program product that includes a computer-readable medium defines a further related aspect. The medium includes at least one instruction for causing a computer to receive, from a location-determining entity, an initial golf cup geographic location for a golf cup at a predetermined golf course and at least one instruction for causing a computer to store, in network memory, the initial golf cup geographic location as a current golf cup location. The medium additionally includes at least one instruction for causing a computer to receive, from the location-determining entity, an update to the initial golf cup geographic location based on an occurrence of an automatic event, such as a predetermined event or the like and at least one instruction for causing a computer to store, in memory, the update to the golf cup geographic location as the current golf cup location.

Yet another related aspect is provided for by a network device. The device includes means for receiving, from a location-determining entity, an initial golf cup geographic location for a golf cup at a predetermined golf course and means for storing, in memory, the initial golf cup geographic location as a current golf cup location. The device additionally includes means for receiving, from the location-determining entity, an update to the initial golf cup geographic location based on an occurrence of an automatic event, such as a predetermined event or the like and means for storing, in memory, the update to the golf cup geographic location as the current golf cup location.

A network device that includes a computer platform including at least one processor and a memory defines a further related aspect. The device additionally includes a golf course target location and distance application stored in the memory and executable by the at least one processor. The application is operable to receive, from a location-determining entity, an initial golf cup geographic location for a golf cup at a predetermined golf course and store, in network memory, the initial golf cup geographic location as a current golf cup location. The application is additionally operable to receive, from the location-determining entity, an update to the initial golf cup geographic location based on an occurrence of an automatic event, such as a predetermined event or the like and store, in memory, the update to the golf cup geographic location as the current golf cup location.

In one or more alternate aspects, the automatic event may be sensing a predetermined level of motion in the golf cups, occurrence of a predetermined set time, such as a set time that occurs after the movement of the golf cup on the golf course green and/or receipt of a remote trigger at the golf cup or flagstick The network device may further include a communications module operable to communicate, wirelessly, upon request, the current golf cup location to a wireless device, communicate the current golf cup location in response to a request for information related to the golf course, and/or communicate the current golf cup location in response to a request for the current golf cup location based on initiation of a golf cup distance request by the wireless device.

In an alternate aspect of the network device, the location-determining entity may be external to and remote from the network device or the location-determining means may be included in the network device.

In a further alternate aspect, the application may be operable to receive a wireless device position from the location determining entity or the wireless device, determine a distance to the golf cup based on the current wireless device geographic location and the current golf cup geographic location, and communicate the distance to the cup to the wireless device.

Yet another aspect is provided for by a system for determining the distance to a golf cup on a golf course. The system includes a plurality of asset tags. Each asset tag is located proximate a golf cup on a golf course. Each of the plurality of asset tags is operable to initiate the determination of a golf cup geographic location based on occurrence of an automatic event, such as a predetermined event or the like.

The system additionally includes a network device that includes a golf course target location and distance application. The application is operable to receive, from a location-determining entity, the golf cup geographic location, store the golf cup geographic location as a current golf cup location, receive, from the location-determining entity, an update to the golf cup geographic location based on the occurrence of the event, store, in memory, the update to the golf cup geographic location as the current golf cup location and communicate the current golf cup location.

The system additionally includes a wireless communication device that includes a golf course distance measuring application. The application is operable to wirelessly receive the current golf cup geographic location, receive a request to obtain a distance to the golf cup, obtain a wireless device geographic location based on the request, obtain a distance to the golf cup based on the wireless device geographic location and the golf cup geographic location and present the distance to the golf cup on the wireless device.

Yet another aspect is defined by a method for determining a distance to a target. The method includes obtaining, by a wireless device, a wireless device geographic location, and a target geographic location. The target comprises an asset tag and the target geographic location is determined automatically based on an occurrence of an event, such as a predetermined event or the like. The method further includes obtaining, by the wireless device, a distance to the target based on the wireless device geographic location and the target geographic location and presenting the distance to the target on the wireless device. The event may be defined as sensing of a predetermined level of motion associated with the target, as a predetermined time of day, a remote trigger, or the like.

A wireless device defines a further aspect. The wireless device includes a computer platform including at least one processor and a memory. The wireless device also includes a target distance measuring application stored in the memory and executable by the at least one processor. The application is operable to obtain a wireless device geographic location and a target geographic location, to obtain a distance to the target based on the wireless device geographic location and the target geographic location, and to present the distance to the target on the wireless device. The target comprises an asset tag and the target geographic location is determined automatically based on occurrence of an event, such as a predetermined event or the like.

Thus, present aspects provide for devices, apparatus, systems, methods and computer program products for determining distances to golf cups and associated predetermined targets on a golf course using a wireless communication device, such as a cellular telephone. Cellular telephone implementation allows for existing devices to be configured with the requisite application to provide the golf course distance measuring capabilities according to the present aspects. Present aspects provide for accurate and automated determination of the distance to the target, such as a golf cup. Current aspects use a geographic location determination system, such as GPS and/or communication network solutions, to determine the distance to the desired target and provide for automatic location/position fixes to be performed when a target, such as a golf cup, is moved to a new location, without requiring any human intervention. Additionally, present aspects provide for golf course information, such as course layout and the like, to be communicated via a wireless network, such as a cellular network, to the wireless device. In this regard, the golfer/user may obtain golf course information at any point in time prior to or during a round of golf, obviating the need to pre-load golf course information via a wired connection to a communication network.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

The present devices, apparatus, methods, computer program products, and processors now will be described in more detail hereinafter with reference to the accompanying drawings, in which aspects of the invention are shown. The described aspects, however, may be embodied in many different forms and should not be construed as limited to the aspects set forth herein; rather, these aspects are provided so that this disclosure will be thorough and complete, and will fully convey the scope of the invention to those skilled in the art. Like numbers refer to like elements throughout. Broken lines in the figures indicate elements of aspects that are optional.

As used herein, the word "exemplary" means "serving as an example, instance, or illustration." Any aspect described herein as "exemplary" is not necessarily to be construed as preferred or advantageous over other aspects.

One or more aspects described herein are in connection with a wireless communication device. A wireless communication device can also be called a subscriber station, a subscriber unit, mobile station, mobile, remote station, access point, remote terminal, access terminal, user terminal, user agent, a user device, a client or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Figure 1:
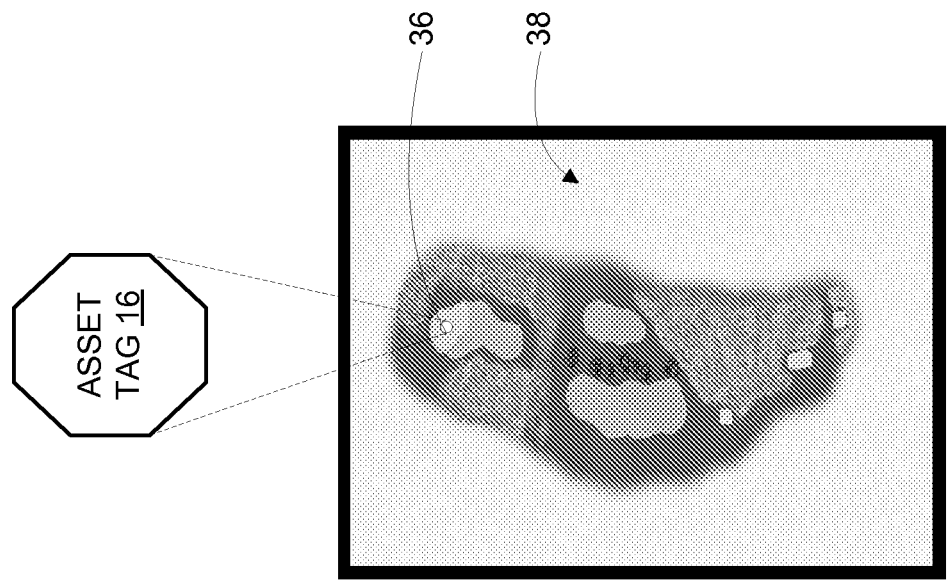
FIG. 1 is a block diagram of a system for determining distances to predetermined targets on a golf course, according to an aspect.
Figure 1:
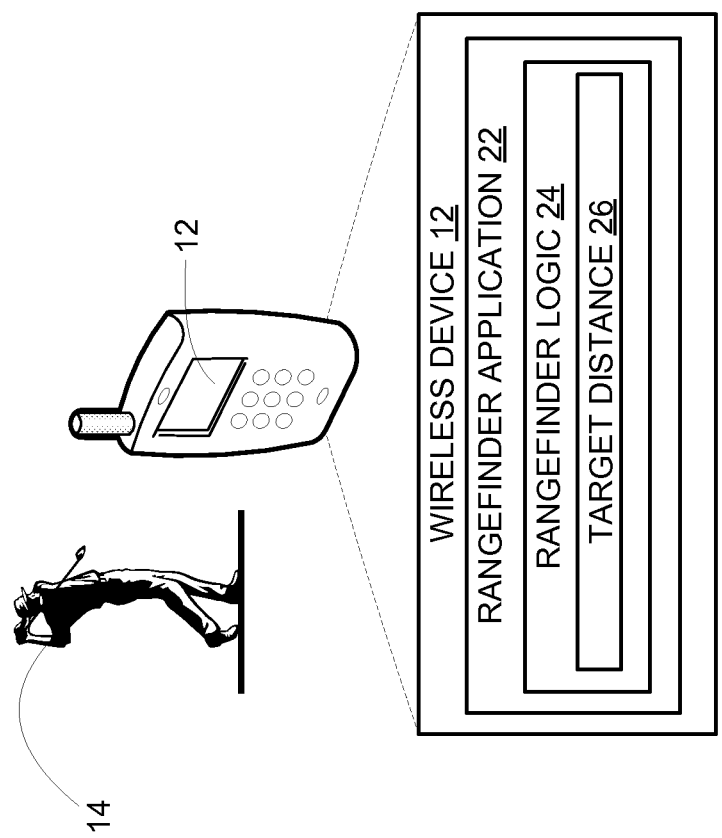

Referring to FIG. 1, depicted is a block diagram of a system for determining distance to predetermined targets, such as targets on a golf course, according to one aspect. The system includes a wireless device 12, operated by a user, such as a golfer 14; and a plurality of asset tags 16, each asset tag is affixed to, or otherwise located, proximate a predetermined target, such as a golf course target.

The wireless device 12, which, as shown in FIG. 1 may, in one aspect, comprise a cellular telephone, includes a rangefinder application 22 having associated rangefinder logic 24 operable for determining the target distance 26 to predetermined targets on the golf course, such as golf cups 36 and the like.

The system 10 additionally includes a plurality of asset tags 16 that are, at a minimum, located in close proximity and may be affixed to targets, such as the golf cups 36 on each golf hole 38 of a golf course. The term "asset tag" is a generic term that applies to any small location device and, in particular, a location device capable of providing location tracking of the asset, or in this instance the target, to which it is associated. One such example of an asset tag 16 is an in Geo asset tag, available from QUALCOMM Incorporated of San Diego, Calif. The tracking nature of asset tags 16 provides for location of targets to be conducted automatically, thus eliminating the need for human-interaction in determining the location of a transitory golf course target, such as a golf cup 36.

The proximity of the asset tag 16 to the golf cup 36 should be such that the location of the asset tag 16 provides for an accurate determination of the distance between the golf cup and wireless device 12. In order to be located proximate the golf cup, the asset tag 16 may be affixed, either permanently or removably, to the golf cup, the flagstick, or the flag attached to the flagstick, or the hole-cutting device. For the purpose of the aspects herein described, the flagstick includes the attached flag and, therefore, reference to an asset tag being affixed to a flagstick includes aspects in which the asset tag may be attached to the flag. As previously noted, golf cups are re-positioned on a golf green, sometimes as frequently as on a daily basis, and therefore, the asset tag 16 that is associated with the golf cup will be affixed to the golf cup, flagstick or flag to accommodate the need to frequently obtain new geographic location data and to automate the overall process. Any other golf course targets that are viewed as transitory may also be affixed with an asset tag.

By affixing asset tags 16 proximate the golf cup, the flagstick, or the flag attached to the flagstick, or the hole-cutting device present aspects are able to determine a distance to the golf cup as opposed to the distance to the green or the distance to the center of the green. Thus, present aspects provide the golfer with one of the most desirable distances, i.e., the distance to the golf cup and, as discussed in detail infra provide such in a highly efficient manner.

Figure 2:
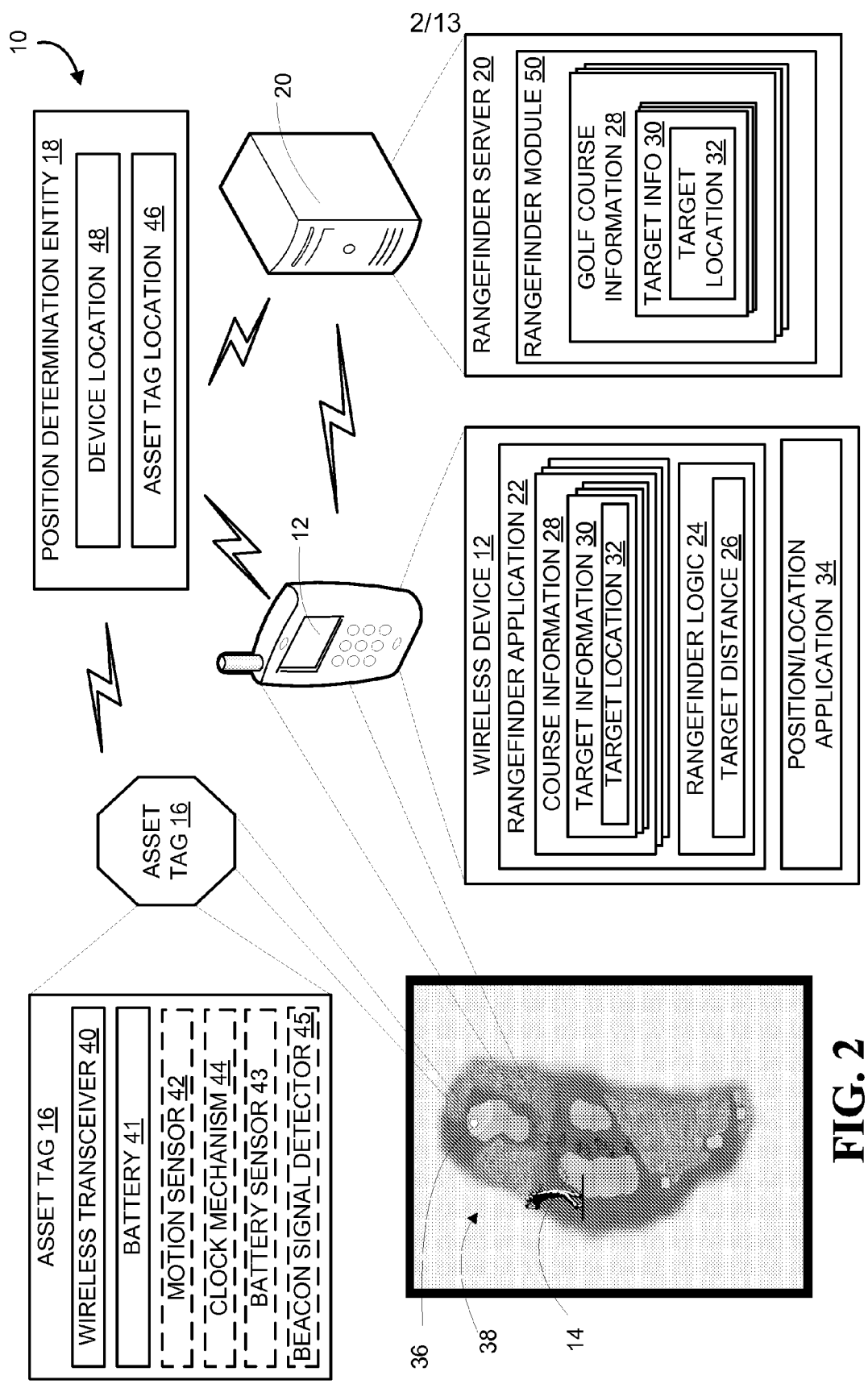
FIG. 2 is a more detailed block diagram of a system for determining distances to predetermined targets on a golf course, according to an aspect.

Referring to FIG. 2, a more detailed block diagram of a system for determining distance to predetermined targets, such as golf cups, also referred to as golf holes, on a golf course is shown, according to one aspect. The system 10 includes a wireless device 12, operated by a user, such as a golfer 14, a plurality of asset tags 16, each tag proximate a predetermined target, such as a golf cup on a golf course, a position determining entity 18 and network device 20, such as a rangefinder server. In addition to a golfer, the wireless device may be operated by a caddie, another member of golf grouping, a spectator, or any one else located on a golf course that would benefit from having distance and/or directional information.

The wireless device 12 includes a golf course distance measuring application, otherwise referred to herein as a rangefinder application 22. The application 22 may be pre-loaded on a newly purchased wireless device 12 or the application may be loaded to an existing device via wired or wirelessly downloading of the application 22 from an appropriate service provider. The rangefinder application 22 may include rangefinder logic 24 that is operable to determine target distance 26, such as distance from the device to a golf cup and/or the distance from the device to other predetermined targets associated with the golf cup, such as greens boundaries, hazard boundaries, such as bodies of water, bunkers, out-of-bounds boundaries and the like. The rangefinder logic 24 may additionally be operable to determine other distances on the golf course, such as the distance of previous golf shots or the like. In alternate aspects, in which determination of the target distances 26 is conducted at a network device, such as rangefinder server 20 or the like, and subsequently communicated to the wireless device, the need for the wireless device 12 to include rangefinder logic 24 may be obviated.

Target distance 26 may be determined based on the geographic location of the wireless device and the geographic location of the target. As such, the rangefinder application 22 may include golf course information 28 that includes target information 30 including the current target geographic location 32. Golf course information 28 may be automatically acquired, wirelessly, by the wireless device 12 prior to the beginning of the golfer's round of golf. For example, the system 10 may provide for the wireless device 12 to recognize, via GPS or other location determining mechanisms, that the device is positioned at or within the proximate vicinity of a golf course equipped for using the distance measuring application of the present aspects. Recognition that the wireless device is at or in the proximate vicinity of the golf course may trigger the rangefinder server 20 to automatically communicate the golf course information 28 without the need for user intervention or user input. Alternatively, wireless device 12 may accept inputs at any time that allow a user/golfer to communicate with rangefinder server 20 to obtain golf course information. In other alternate aspects, the golf course information may be acquired by wireless device 12 via a wired connection to a network device, such as rangefinder server 20 or the like.

Further, the wireless device 12 may acquire or update the golf course information 28 at any point during a round of golf, either automatically or upon receiving a user request. In some aspects, the wireless device 12 may be configured to automatically and wirelessly receive any updates during a round, such as updates that affect target location 32, such as movement of the golf cup on the green or the like. Wireless acquisition of the golf course information allows the golfer/user to acquire golf course information 28 on-demand and/or automatically, such as at the first tee or during the round of golf. Additionally, providing for the acquisition of golf course information 28 either just prior to the round or during the round insures that the golf course information 28 is current, especially with respect to the location of transitory targets, such as the golf cup or the like. In alternate aspects, the target locations 32 may be received by the rangefinder application 22 separately from the golf course information 28. For example, target locations 32 may be wirelessly received based on the initiation of a target distance request at the wireless device 10.

Additionally, the wireless device 10 includes a position/location application 34 operable to determine the geographic position of the wireless device. The application 34 may be a communication network-based positioning system application, such as an Advanced Forward Link Trilateration (AFLT) positioning system, and/or a Global Positioning System (GPS) application, and/or a Differential GPS application. In any case, application 34 operates using any known mode of position/location determining operation, for example GPS-based modes, such as Mobile Station (MS)-based mode, MS-assisted mode, standalone mode or the like and/or network-based modes, such as AFLT, E-OTD and the like Further details on geographic position/location determination and some of the known operational modes are presented infra.

As noted in relation to FIG. 1, the system additionally includes a plurality of asset tags 16 that are, at a minimum, located in the proximity of golf cups 36 on a golf hole 38 of a golf course. The asset tags 16 will include a wireless transceiver 40 operable for receiving, for example, GPS satellite signals for location determination and communicating the satellite information to a network device, such as Position Determining Entity (PDE) 18 or the like, via a wireless network, such as the cellular network or the like, for determination of a GPS-based geographic location of the asset tag. Alternatively, the wireless transceiver 40 may be operable for sending timing signals to a network device, such as (PDE) 18 or the like, via a wireless network, such as the cellular network or the like, for determination of a network-based geographic location of the asset tag.

The asset tags 16 will additionally include a battery 41 operable for providing requisite power to the wireless transceiver and any other active components of the asset tag. In some aspects, the asset tags may additionally include a battery sensor 43 operable for detecting a predetermined low level of battery power in battery 41. Sensing of the low battery power level may trigger wireless communication with a network entity, which in turn may notify a greens keeper or other golf course attendant that the tag requires recharging. Asset tags 16, such as the in Geo asset tags, benefit from a low-duty cycle (LDC) and therefore offer an extended battery life. In this instance, it is envisioned that asset tags 16 may have a minimum battery life of a few or several months, depending upon how many asset tag fixes occur during a day or any given time period. Recharging of the asset tags or any other maintenance to an asset tag may require the tag to be removed from the green area, such as moving the asset tags to a facility for recharging. In those aspects, in which determination of the golf cup location is initiated based on sensing of a predetermined level of motion in the golf cup, the asset tags may be zoned for location determination within specified predetermined areas, such as the area of the green only. Geofencing technology, e.g. defining or identifying a predetermined geographic area, included within the asset tags and/or system 10, allows system 10 to designate the respective green as an area/zone for location determination with respect to asset tags, such that movement outside of the green will not result in a location determination.

The asset tag 16 may optionally include a motion sensor 42, such that when the asset tag is affixed to a transitory target, such as a golf cup, the motion sensor 42 will sense movement of the golf cup. Movement of the cup signifies that the hole location is being changed and, thus, a new location determination is required for the golf cup. In one aspect, the location of the golf cup may be determined based on the automatic occurrence of an event, such as a predetermined event or the like. In one aspect, the event may be defined as sensing a threshold level of motion/movement (either in terms of motion duration or rate of motion) in the asset tag 16. In this regard, the motion sensor 42 may be implemented to sense the threshold level of motion in the asset tag to automatically trigger a location determination.

In other aspects, the asset tag 16 may optionally include a clock mechanism 44. As noted above, in certain aspects, the location of the golf cup may be determined based on the automatic occurrence of an event, such as a predetermined event or the like. In one aspect, the event may be a predetermined time of day. For example, a time of day that occurs shortly after the groundskeeper has changed the hole location. In this instance, the clock mechanism 44 may be operable to set an alarm that triggers the automatic occurrence of a location determination based on the time at which the alarm is set.

In still other aspects, the asset tag 16 may optionally include a beacon signal detector 45 operable to receive beacon timing signals sent from wireless device 12 for the purpose of determining the distance between the asset tag 16 and the wireless device 12. In certain aspects, in which a network-based location determination is implemented, such as AFLT, E-OTD or the like, the wireless device may transmit a beacon, which is received by the asset tag. Based on the time at which the beacon signal is sent and received and the rate at which the signal is sent, a PDE 18, a rangefinder server 20 or some other network device can determine the distance between the asset tag 16 and the wireless device 12. In alternate aspects, the beacon signal detector 45 may be included in the wireless devices 12 and the asset tags may communicate the requisite beacon signal.

In those aspects, in which the asset tag 16 determines distance using AFLT, E-OTD or some other network-based location determination mode, the determination may be implemented in conjunction with a GPS-based location determination. In such aspects, the network-based location determination mode may be used to correct any error introduced by satellite positioning based on calculating the location of the golf cup at one time of day (e.g., early morning) and calculating the location of the golfer/wireless device at another time of day (e.g., possibly late afternoon). For example, according to such aspects, the GPS location of the golf cup may be determined in the morning and the GPS location of the wireless device and, in some aspects, the GPS location of the cup may be determined during the round of golf. Additionally, in those aspects that implement a network-based location/ distance determination mode, the wireless device and golf cup locations/distances may be determined during the round of golf to further increase the accuracy of the GPS-based location determinations. In alternate aspects, the network-based location determination may serve as the only location/distance determination mechanism, supplanting the need to implement GPS-based location determination.

In alternate aspects, asset tags 16 may be used to obtain the geographic location of permanent targets on a golf course, such as green boundaries, hazard boundaries, such as bodies of water, bunkers, out-of-bounds and the like. Since these permanent targets remain stationary, the asset tag needs to only be placed at the designated target area for the duration of the location determining process and then may be removed. Thus, use of the asset tags 16 in connection with determining the location of a stationary target may be a one-time-only process that does not require the asset tag to be continuously affixed to the target.

The system additionally includes a Position Determining Entity (PDE) 18, which may be in wireless communication with the asset tags 16 and the wireless device 12. PDE 18 may be a single device or some combination of multiple devices capable of respectively determining the location/position of the asset tags 16, and/or the location/position of the wireless device 12, and/or that may be capable of providing location-determining information to the wireless device 12. Additionally, PDE 18 is in wired or wireless communication with rangefinder server 20. Further, it should be noted that PDE 18 may be included in the same device as rangefinder server 20, and/or that the functionality of PDE 18 and rangefinder server 20 may be implemented across any combination of multiple devices. PDE 18 is operable to determine the asset tag location 46, which may be based on communication network-based information and/or satellite-based information received by the asset tags 16 and forwarded to the PDE 18, and may further include other location determining information received from the asset tags 16. Once the PDE 18 determines the asset tag location 46, the PDE communicates with the rangefinder server 20, either wirelessly or via a wired connection, to forward the asset tag location 46, which is subsequently stored as a target location 32 at the rangefinder server 20 along with corresponding golf course information 28

In some aspects, PDE 18 may additionally be configured to determine wireless device location 48, which may be based on communication network-based information and/or satellite-based satellite information received by the wireless device 12 and forwarded to the PDE 18, and may additionally include other location determining information forwarded from the wireless device 12. Alternatively, the PDE may provide the wireless device 12 with information that assists the wireless device in determining the wireless device geographic location.

The system may additionally include a network device, such as a rangefinder server 20, which is in wired or wireless communication with PDE 16 and wireless communication with wireless device 12. The network device includes a golf course target location and distance module, otherwise referred to as a rangefinder module 50 that stores golf course information 28 for one or more golf courses. The network device 20 receives location information, such as asset tag location 46 (i.e., target location 32) or the like, from the PDE 18. The rangefinder server 20 may store the target location 32 in an associated golf course information 28 file and associated target information 30 subfile. Additionally, rangefinder server 20 wirelessly communicates the target location 32, in some aspects in conjunction with communication of associated golf course information 28, to the wireless device 12 either automatically, based on a change in target location, or as requested by the wireless device 12.

Figure 3:
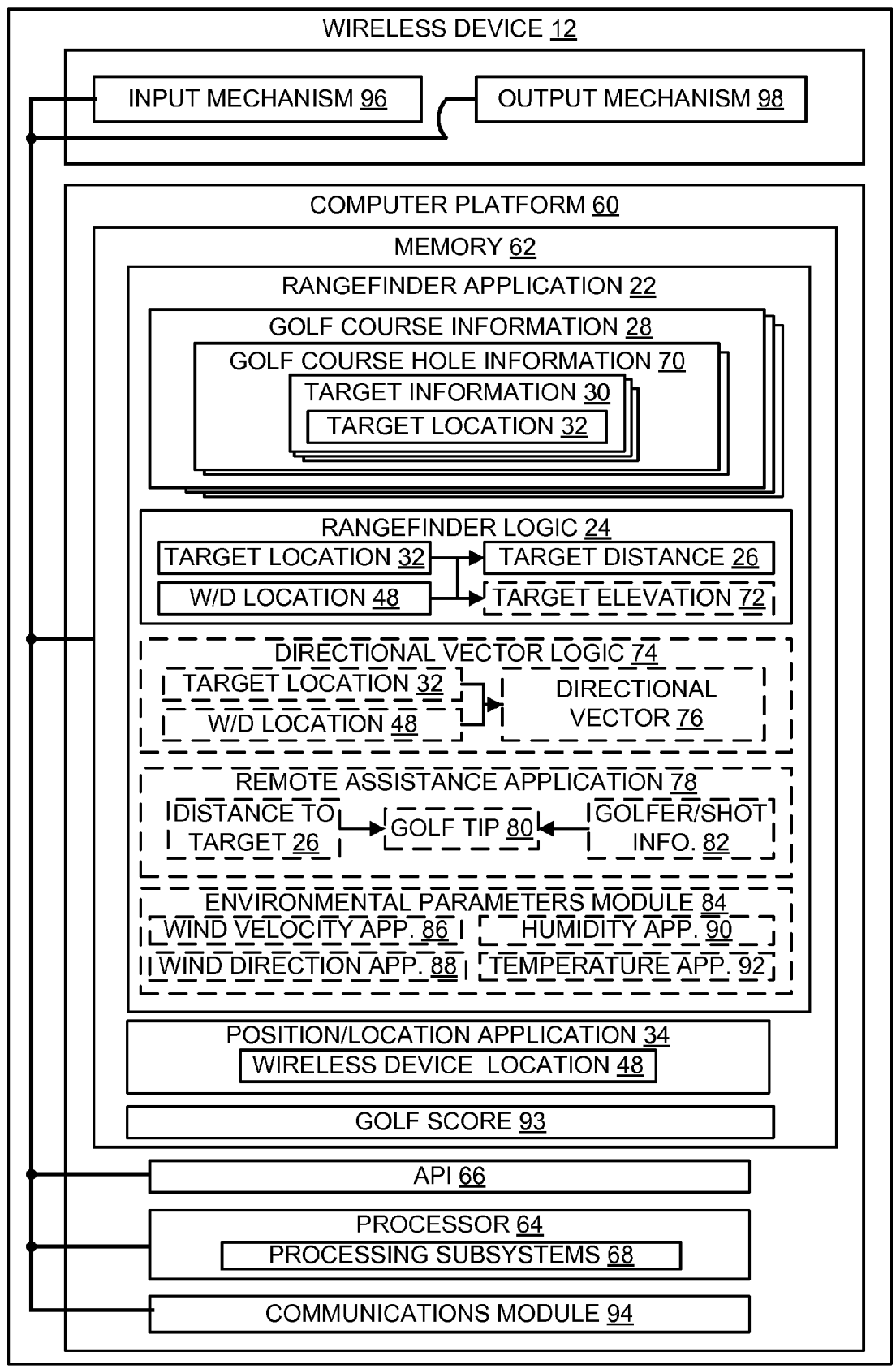
FIG. 3 is a block diagram of a wireless communication device configured for determining and presenting distances to predetermined targets on a golf course, according to an aspect.

Referring to FIG. 3, according to one aspect, a more detailed block diagram representation of wireless communication device 12 is depicted. The wireless communication device 12 may include any type of computerized, communication device, such as cellular telephone, Personal Digital Assistant (PDA), two-way text pager, portable computer, and even a separate computer platform that has a wireless communications portal, and which also may have a wired connection to a network or the Internet. The wireless communication device can be a remote-slave, or other device that does not have an end-user thereof but simply communicates data across the wireless network, such as remote sensors, diagnostic tools, data relays, and the like. The present apparatus and methods for determining, on a wireless device, distances to golf cups and predetermined targets on a golf course can accordingly be performed on any form of wireless communication device or wireless computer module, including a wireless communication portal, including without limitation, wireless modems, PCMCIA cards, access terminals, desktop computers or any combination or sub-combination thereof.

The wireless communication device 12 includes computer platform 60 that can transmit data across a wireless network, and that can receive and execute routines and applications. Computer platform 60 includes memory 62, which may comprise volatile and nonvolatile memory such as read-only and/or random-access memory (RAM and ROM), EPROM, EEPROM, flash cards, or any memory common to computer platforms. Further, memory 62 may include one or more flash memory cells, or may be any secondary or tertiary storage device, such as magnetic media, optical media, tape, or soft or hard disk.

Further, computer platform 60 also includes processor 64, which may be an application-specific integrated circuit ("ASIC"), or other chipset, processor, logic circuit, or other data processing device. Processor 64 or other processor such as ASIC may execute an application programming interface ("API") layer 66 that interfaces with any resident programs and/or modules, such as rangefinder application 22, stored in the memory 62 of wireless device 12. API 66 can be a runtime environment executing on the respective wireless device. One such runtime environment can be Binary Runtime Environment for Wireless® (BREW®) software developed by QUALCOMM Incorporated of San Diego, Calif. Other runtime environments may be utilized that, for example, operate to control the execution of applications on wireless computing devices.

Processor 64 includes various processing subsystems 68 embodied in hardware, firmware, software, and combinations thereof, that enable the functionality of wireless device 12 and the operability of the wireless communication device on a wireless network. For example, processing subsystems 68 allow for initiating and maintaining communications, and exchanging data, with other networked devices. In one or more aspects in which the communication device is defined as a cellular telephone, the communications processor 64 may additionally include one or a combination of processing subsystems 68, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc. (all of which are not individually depicted in FIG. 3 for the sake of clarity). For one or more of the disclosed aspects, processing subsystems 68 of processor 64 may include any subsystem components that interact with the rangefinder application 22. For example, processing subsystems 68 may include location and tracking devices/applications, such as GPS applications/devices, AFLT applications/devices, such as a beacon signal detector, environmental devices/applications, such as wind direction/speed applications/devices, temperature applications/devices, humidity applications/devices and the like that are implemented in conjunction with rangefinder application 22. Alternatively, one or more of the processing subsystems 68 may be configured as modules/applications and/or logic stored in memory 62.

The memory 62 of computer platform 60 includes a golf course distance measuring application, otherwise referred to herein as a rangefinder application 22, operable to obtain a distance to a golf cup and associated predetermined targets on a golf course and present the distances on the wireless device. The rangefinder application 22 may include rangefinder logic 24 that is operable to determine target distance 26, such as distance to a golf cup and/or the distance to other predetermined targets associated with the golf cup, such as greens boundaries, hazard boundaries, such as bodies of water, bunkers, out-of-bounds boundaries and the like. The rangefinder logic 24 may additionally be operable to determine other distances on the golf course, such as the distance of previous golf shots or the like. In another aspect in which determination of the target distances 26 is conducted at a network device, such as rangefinder server 20 or the like, and subsequently communicated to the wireless device, the need for the wireless device 12 to include rangefinder logic 24 may be obviated.

The golf course distance measuring application 22 may be configured to automatically determine the distance to the golf cup and other predetermined golf course targets based on initiation/launching of the application 22. In this regard, the golfer/user may not be required to make any inputs to the wireless device to receive distance to the golf cup and/or distances to targets. The application may assume that the golfer is beginning play on the first hole and, accordingly, the application may provide distance information to the first golf cup and predetermined targets associated with the first hole. Alternatively, if the golfer/user 14 starts on another hole, the application provides for the user to scroll or otherwise move to the hole being played to obtain the distance to the hole being played and the associated target information.

Geofencing technology may be included within the rangefinder logic 24 and/or system 10 to automatically determine that the golfer/user 14 has moved to the next hole on the golf course. Once the application has determined that the golfer/user has moved to the next hole, the application 22 may automatically provide distance information to the next hole golf cup and predetermined targets associated with the next hole. Geofencing provides for a predetermined geographic area to be defined that corresponds to all and/or portions of respective golf holes, thereby allowing system 10 to track movements by the golfer/user on the respective course and automatically update information presented by the application to the golfer/user. In this instance, a geofence may define the area of each green, such that when the wireless device 12, in possession of the golfer/user, exits the green it triggers the application to automatically move to the next hole on the golf course and obtain information relating to the next hole, such as the distance to the next hole golf cup and other predetermined next hole targets. Alternatively, the application 22 may be configured to allow for the golfer/user to manually scroll or otherwise move the application to the next or any other hole on the course to obtain the distance to the next hole golf cup and other predetermined next hole targets.

In addition to automatically obtaining the distance to the golf cup and predetermined targets, application 22 may be configured to receive requests, such as user inputs, for distance determinations to the golf cup or other predetermined golf course targets. A request may take the form of a user input to a predetermined designated keypad or button or, alternatively, the golf course distance measuring application may be preconfigured to allow for voice commands to initiate a request.

Target distance 26 may be determined based on the wireless device geographic location 48 and the target geographic location 32. As such, the rangefinder application 22 may include golf course information 28 that may include golf hole information 70 that include target information 30 including the current target geographic location 32. As previously noted, golf course information 28 can be acquired, wirelessly, by the wireless device 12 prior to the beginning of the golfer's round of golf. Alternatively, the wireless device 12 may acquire or update the golf course information 28 at any point during a round of golf. In one or more aspects, the wireless device 12 may be configured to automatically and wirelessly receive any updates during a round, such as updates that affect target location 32, such as movement of the golf cup on the green or the like. In another aspect, the target locations 32 may be received by the rangefinder application 22 separately from the golf course information 28. For example, target locations 32 may be wirelessly received based on the initiation of a target distance request at the wireless device 10.

In another aspect, the rangefinder logic 24 of rangefinder application 72 may be configured by determine wireless device location 48 and target location 32 at substantially the same point in time. Such configuration may be advantageous in accurately determining the distance to targets requiring a high degree of accuracy, such as the golf cups. Determining the wireless device location 48 and the target location 32 at substantially the same point in time insures that any inaccuracies in the locations due to the position of the satellites or other environmental factors are substantially the same and, thus offset each other in determining the target distance 26. Thus, "substantially" the same point in time may be defined as any time period that results in substantially the same level of inaccuracy for the predicted golf cup location and the predicted wireless device location.

For example, if satellite positioning imparts a 2-foot due north inaccuracy to the target location 32 then it can be assumed that if the wireless device location is determined at substantially the same point in time a 2-foot due north inaccuracy would also be imparted to the wireless device location 48. In this instance, the target distance 26 remains unaffected and accurate since the inaccuracy imparted to both the target location 32 and wireless device location 48 are equivalent. Conversely, if the target location 32 is determined at one point in time, such as early morning and the wireless device location 48 is determined at another point in time, such as late afternoon, the inaccuracy imparted to each location determination may differ due to positioning of the satellites or other environmental factors. In such aspects, it may not be required for target information 30 and, specifically, target location 32 to be communicated to the wireless device 12 along with golf course information 28 prior to the round of golf. At a minimum, the golf course information 28 that is communicated prior to the round of golf may not be required to include target locations 32 for targets requiring a high degree of accuracy, such as golf cups or the like because these target locations may be configured to be determined at the same point in time as wireless device location 48 is determined.

In addition to determining target distance 26, the rangefinder location 22 may determine target elevation 72 based on the geographic location of the target 32 and the geographic location of the wireless device 48. Target elevation may be beneficial to the golfer in determining club selection, shot approach and the like.

Additionally, the wireless device 10 includes a position/location determination application 34 operable to determine the wireless device geographic location 48. The application 34 may be a communication network-based position/location application, and/or a Global Positioning System (GPS) application, and/or a Differential GPS application that operates using any known or future position/location determination mode of operation, such as a GPS-based mode, for example Mobile Station (MS)-based mode, MS-assisted mode, standalone mode or the like and/or a network-based mode, such as Advanced Forward Link Trilateration (AFLT) mode. Other location determination modes may also be implemented and include, but are not limited to, modes such as cell identification, enhanced cell identification, time of arrival, angle of arrival, enhanced observed time difference (E-OTD), cell broadcast, and cell-based position.

For example, in one aspect, the location determination application 34 may implement the GPS MS-based mode of location determination. The MS-based mode is characterized in that calculation of the device location occurs at the wireless device using a location determination function. While MS-based mode may utilize PDE 18 assistance information, such as ephemeris data and/or almanac data, to assist in obtaining GPS signals, each location determination attempt may not necessarily include communication with the PDE 18 if the PDE assistance information is current enough to determine location. For example, in one aspect, during the very first MS-based mode attempt, the location determination application 34 will download ephemeris data and almanac data. It should be noted, however, that this information might be acquired in other manners. Thereafter, location determination application 34 may perform an ephemeris check to look at the almanac data to see if there are any satellites recently risen, and will request new or updated ephemeris data, if necessary, based on the number of satellites in view for which it already has fresh ephemeris data. For example, depending on the size of the satellite network, an ephemeris check may result in a request to update PDE assistance information occurring every 30 to 90 minutes. When the wireless device 12 updates the PDE assistance information, then the wireless device 12 communicates through a communication link via the wireless network with the PDE 18 to obtain current ephemeris data and/or almanac data. Once the wireless device has verified or obtained PDE assistance information, the wireless device uses the PDE assistance information to set the parameters for receiving the GPS signals, and subsequently receives the timing signals broadcasted from the GPS satellites. Once the GPS signals are received, the wireless device 12 decodes the signals using the PDE assistance information to aid in setting the decode parameters. The wireless device then uses the decoded timing information and executes a location determination function to determine device location 48.

More specifically, the location determination application 34 that utilizes MS-based mode may implement the gpsOne™ solution, commercially available from QUALCOMM Incorporated of San Diego, Calif. In the gpsOne™ mode, the wireless device does not directly utilize CDMA pilot phase measurements (PPM) in positioning calculations. However, the gpsOne™ MS-based mode is able to utilize some local network parameters to enhance satellite acquisition times and device sensitivity, enabling enhanced time to fix and availability versus typical standalone GPS solutions.

For example, in one aspect, the location determination application 34 may implement the GPS MS-assisted mode of location determination. MS-Assisted mode location determination is characterized in that calculation of the wireless device location 48 occurs at the PDE 18 and, as such, communication with the PDE 18 occurs for each location determination attempt that uses MS-Assisted mode. If the wireless device chooses to update the PDE assistance information, the wireless device 12 communicates through the wireless network with the PDE 18 to obtain current ephemeris data and/or almanac data. Once the wireless device has verified or obtained PDE assistance information, the wireless device uses the PDE assistance information to set the parameters for receiving the GPS signals and, subsequently receives the timing signals broadcasted from the GPS satellites. Once the GPS signals are received, the wireless device decodes the signals using the PDE assistance information to aid in setting the decode parameters. The wireless device uses the decoded timing information to make measurements related to the distance from the GPS satellites and the wireless device 12 communicates the measurement information to the PDE 18. The PDE 18 uses the measurement information and executes a location determining function to determine the wireless device location 48. Thus, for MS-Assisted mode, a wireless network signal or communication link is utilized as the MS-Assisted mode performs communication with the PDE 18.

More specifically, the location determination application 34 that utilizes MS-assisted mode may implement the gpsOne™ solution. The gpsOne™ solution uses the wireless device to collect satellite data as well as CDMA pilot phase measurements (PPM). This information is used by the PDE 18 to calculate the location of the wireless device 12. In one aspect, the wireless device 12 operates to act as a sensor to enable position calculation on the PDE 18. In turn, the PDE 18 provides both sensitivity and acquisition assistance information that greatly enhances GPS sensitivity, system availability, terrain coverage, and accuracy as well as performing the positioning calculations to provide a location, also referred to as a fix. By utilizing PDE assistance information, the MS-Assisted mode solution provides the highest level of GPS sensitivity and accuracy while essentially eliminating cold start time. The concurrent use of CDMA-based pilot information enables deep indoor location capability in addition to enhancing AGPS performance.

In another example, in some aspects, the location determination application 34 may implement the GPS standalone mode of location determination. Standalone mode is characterized in that calculation of the device location occurs at the wireless device and without communication with PDE 18. However, standalone mode is generally the most processing intensive location determination mode as compared to the MS-based, MS-assisted and network-based modes, and thus the Standalone mode utilizes the most battery power. The standalone GPS mode of operation may be utilized when the wireless device is out of cellular coverage, when the wireless device does not have access to a PDE 18, or when minimizing data transactions is desired. In standalone mode, the wireless device receives timing signals broadcasted from GPS satellites. The wireless device uses the timing signals and executes a position determining function to determine wireless device location 48.

In yet another example, in some aspects, the location determination application 34 may implement the network-based AFLT mode of location determination. AFLT is a wireless device-based location determination technology that uses a time difference of arrival technique to determine location. In regards to present aspects, the wireless devices may be configured to send a beacon signal and the asset tag configured to receive the signal, or vice versa. Based on the time that the beacon signal was sent, the time at which it was received and the rate/speed at which the beacon signal is communicated, the distance between the wireless device and the asset tag can be determined. The distance determination can be accomplished at the rangefinder server, the PDE and/or at the wireless device. As previously noted, in some aspects a network-based location determination mode may be used in conjunction with a GPS-based location determination mode for the purpose of further increasing the accuracy of the location determination. In other aspects, the network-based location determination may serve as the sole location/distance determination mechanism.

In addition to determining the distance to golf cups and other predetermined golf course targets, the golf course distance measuring application 22, specifically rangefinder logic 24, may be operable to determine other distances on the golf course, such as the distance of previous golf shots or the like and present these distances to the golfer/user 14 via output mechanisms on the wireless device 12. For example, in one aspect, the golfer/user 14 may provide an input to the device that instructs the application 22 to store the current geographic location of the wireless device 12, which corresponds with the current location of the golf ball or the location from which a golf shot was just taken. As the wireless device, in possession of the golfer/user, moves to the next shot location the rangefinder logic 24 may determine the distance from the previous shot based on the stored geographic location and the current geographic location of the wireless device. In some aspects, the application 22 may be capable of automatically determining and presenting dynamic information as to the distance from the previous golf shot. For example, the distance from the previous shot may be updated based on a new location determination provided for by the wireless device. In other aspects, the distance from the previous golf shot may be obtained by receiving a user input, which triggers the application 22 to obtain a current geographic location determination and to determine the distance from the previous golf shot based on the current geographic location of the wireless device and the stored geographic location of the wireless device associated with the previous golf shot. Additionally, the application may be configured to store the distance of all golf shots made during a round of golf and automatically, or at the user's request, determine average driver distance or the like for the round of golf.

Figure 7:
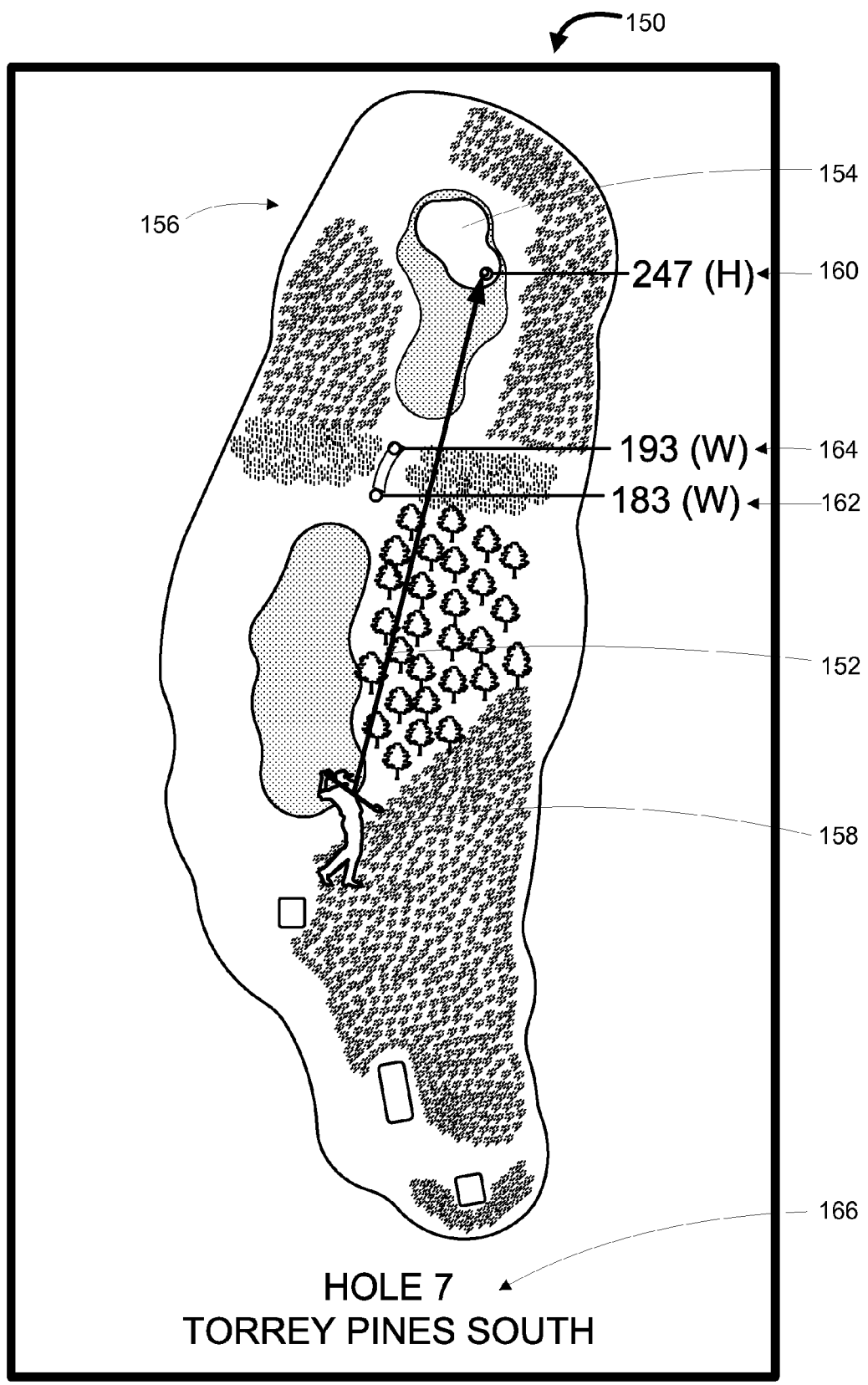
FIG. 7 is an illustrative example of a display on a wireless communication device providing a golf course hole overview and a golf hole directional vector, according to an aspect.

The rangefinder application 22 may optionally include directional vector logic 74 operable determine direction to a target/directional vector 76 based on the target location 32 and the wireless device location 48. In many instances on a golf course, a golfer may be presented with a "blind" shot that does not provide the golfer with a line-of-sight to the intended target, such as the golf cup or the like. The golfer will be required to move to another location in order to obtain a line-of-sight to the intended target. This is a time-consuming process that results in slower overall play on the golf course. In order to overcome the need to move about the course to obtain a line-of-sight, a directional vector 76 (i.e., direction to the target) is determined and presented on an output mechanism 98, such as a device display. The golfer uses the displayed directional vector to line up the direction of the ensuing shot. In one aspect, the directional vector 76 may be displayed in conjunction with an overview of the current hole being played or the directional aspect may be displayed in a compass style format. FIG. 7, which will be discussed in detail infra, provides an example of a display that includes directional vector 76.

The rangefinder application 22 may optionally include a remote assistance application 78 that is operable to communicate the determined target distance 26 to a remote assistant, such as a remote golf professional, (not shown in FIG. 3) which may respond with a golf tip 80. For example, golf tip or assistance 80 may include, but is not limited to, a tip on club selection, shot approach, shot stance, grip advice, swing advice, or the like. The remote assistant may have access to the golf course information 28 to assess the current shot that the golfer is facing. In addition to the target distance 26, the golfer may communicate other golfer and/or golf shot information 82 to the remote assistant, such as description of the current lie and/or a video or series of photos of the golfer's swing. The description of the current lie may be sent by the golfer via SMS or any other communication mechanism. The golfer's swing video or series of photos may be captured with a camera internal to the wireless device and, as such may be taken just prior to the request for assistance and sent to the remote assistant in conjunction with the target distance 26 or, alternatively, the golfer's swing video or series of photos may be sent to the remote assistant prior to the round of golf.

The rangefinder application 22 of wireless device 12 may additionally optionally include an environmental parameter module 84 operable for determining one or more environmental parameters at the point in time that the target distance 26 is obtained, or at some previous point of time, and presenting the environmental parameter(s) to the golfer/user in conjunction with the target distance 26. The environmental parameter module 84 may include, but is not limited to, a wind velocity application 86 operable for determining current wind velocity, a wind direction application 88 operable for determining a current wind direction, a humidity application 90 operable for determining current humidity and a temperature application 92 operable for determining a current temperature. Environmental parameters may also be of benefit to the golfer/user in determining an approach, club selection and the like for the impending golf shot, as such environmental parameters may affect the flight characteristics and/or distance traveled by a golf ball.

In additional optional aspects, the rangefinder application 22 may provide for capturing and storing the golfer/users 14 golf score 93 for a given round. In such aspects, a user interface will be designated, such as a keypad or the like, for inputting the golfer score after a hole, at the end of a round or at any point in time. The score that is inputted may be the raw score, or the adjusted score that reflects the golfer's handicap, and for example further taking into account the equitable score control table to remove the effect of abnormally high individual hole scores by establishing a maximum score per hole based on the golfer's handicap. Further, the rangefinder application 22 may be operable to retrieve golf course information 28, including the respective golf course slope rating and the golf course rating, which may depend on the tees being utilized, and compare the golf course information to the golfer's handicap index in order to determine the respective golf course handicap for the golfer.

In certain instances, the rangefinder application 22 may be configured to logically convert the golfer's raw score to the golfer's adjusted score. After the hole score or overall round score has been inputted, the rangefinder application 22 may be configured to wirelessly communicate the raw or adjusted score 93 to the network device 20 or any other networked device that maintains a golfer/user profile that includes the golfer's handicap "index." In some aspects, the network device may be operable to convert the raw scores to adjusted scores for the sake of maintaining the golfer's index. Communicating the raw or adjusted score 93 to the network device may occur automatically, such as after the round is completed or the application may be configured to communicate the score 93 based on a designated user input. Additionally, the golfer/user may communicate the raw or adjusted score 93 to one or more additional wireless devices, such as wireless devices associated with friends or golf associates. In this regard, the rangefinder application 22 may implement or provide access to a buddy list stored in wireless device memory, such that the application may receive from the golfer/user a designated input selecting one or more recipients from the buddy list, an option to communicate the score 93, and communicating the score 93 wirelessly, such as via SMS or the like, to the selected recipients. Additionally, the buddy list concept may be used to wirelessly inform individuals of a scheduled impending round of golf for the purpose of forming a foursome or other golf grouping.

Wireless communication device 16 may additionally include communication module 94 that is operable for receiving satellite signals, and communicating wirelessly with PDE 18 and rangefinder server 20. In this regard, communications module 90 may be triggered to receive golf course information 28 and target locations 32 from rangefinder server 20 and initiate wireless device location determination either automatically or in response to a golfer/user input for obtaining a target distance 26.

Additionally, wireless communication device 12 may include input mechanism 96 for generating inputs into communication device, and output mechanism 98 for generating information for consumption by the user of the communication device. For example, input mechanism 92 may include a mechanism such as a key or keyboard, a mouse, a touch-screen display, a microphone, etc. In certain aspects, the input mechanisms 92 provide for a user input to initiate the determination of target distance 26, the user input may be a designated keystroke on a keypad, a designated button on the device, a voice command inputted into a microphone or the like. Further, for example, output mechanism 98 may include a display, an audio speaker, a haptic feedback mechanism, a Personal Area Network (PAN) transceiver etc. In the illustrated aspects, the output mechanism 94 may include a display operable to display the distance to target information 26 and other related golf course information 28, a speaker operable to audibly present the distance to target information 26 and other related golf course information 28 or a PAN transceiver operable to audibly present, via an associated headset microphone, such as a Bluetooth® headset or the like, the distance to target information 26 and other related golf course information 28.

Figure 4:
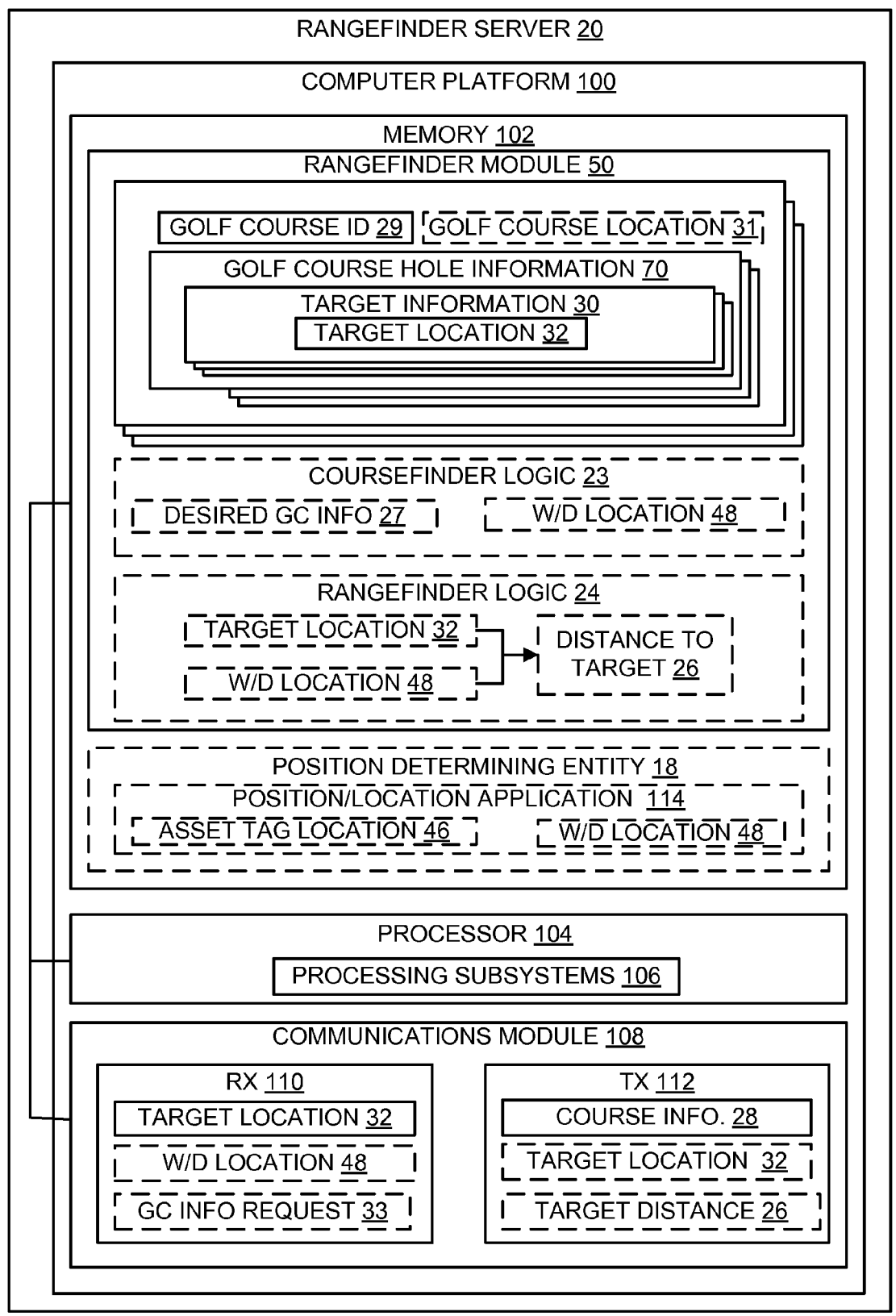
FIG. 4 is a block diagram of a network device for managing and distributing golf course target locations to wireless communication devices, according to an aspect.

FIG. 4 is a more detailed block diagram of a network device, such as a rangefinder server 20, according to one aspect. The rangefinder server 20 may comprise at least one of any type of hardware, server, personal computer, mini computer, mainframe computer, or any computing device either special purpose or general computing device. Further, the modules and applications described herein as being operated on or executed by the rangefinder server 20 may be executed entirely on a single network device, as shown in FIG. 4, or alternatively, in other aspects, separate servers, databases or computer devices may work in concert to provide data in usable formats to parties, and/or to provide a separate layer of control in the data flow between the wireless communication devices 12 and the modules and applications executed by the rangefinder server 20.

The rangefinder server 20 includes computer platform 100 that can transmit and receive data across wired and wireless networks, and that can execute routines and applications. Computer platform 100 includes a memory 102, which may comprise volatile and nonvolatile memory such as read-only and/or random-access memory (RAM and ROM), EPROM, EEPROM, flash cards, or any memory common to computer platforms. Further, memory 102 may include one or more flash memory cells, or may be any secondary or tertiary storage device, such as magnetic media, optical media, tape, or soft or hard disk. Further, computer platform 100 also includes a processor 104, which may be an application-specific integrated circuit ("ASIC"), or other chipset, logic circuit, or other data processing device. Processor 104 may include various processing subsystems 106 embodied in hardware, firmware, software, and combinations thereof, that enable the functionality of network device 20 and the operability of the network device on a wired or wireless network.

The computer platform 100 further includes a communications module 108 embodied in hardware, firmware, software, and combinations thereof, that enables communications among the various components of rangefinder server 20, as well as between the server 20 and wireless communication device 12 and the server 20 and an external PDE 18 (as shown in FIG. 2). The communication module 108 may include the requisite hardware, firmware, software, and/or combinations thereof for establishing a wireless communication connection. According to one or more of the described aspects, the communication module 108 may include a communication receiver 110 operable to receive target locations 32 (i.e., asset tag locations 46) from an external PDE 18. In those aspects in which the rangefinder server 20 includes an internal PDE 18, the communication receiver 110 may be configured to receive location determining information communicated from the asset tags 16 and/or the wireless device 12. Additionally, in those aspects in which the rangefinder server 20 includes rangefinder logic 24, the communication receiver 110 may be configured to receive wireless device location 48 communicated from the wireless device 12 and/or the external PDE 18. Additionally, the communication receiver 110 may be operable to receive a golf course information request 33 communicated from a wireless device 12, The communications module 108 may additionally include a communication transmitter 112 operable to communicate golf course information 28 and/or separate target locations 32 to the wireless device 12. In some alternate aspects, in which the rangefinder application is configured to determine the target distance 26, the communication transmitter 112 may communicate the target distances 26 to the wireless device 12.

The memory 152 of rangefinder server 20 also includes golf course target location and distance module, otherwise referred to as a rangefinder module 50. The rangefinder module includes a plurality of golf course information 28 files and/or data that correspond to the golf courses that support the range finding application of the presently described aspects. Golf course information 28 files may be preloaded in the rangefinder module 50 or added to the module 50 as additional golf courses initiate support of the range finder application. Golf course information 28 files may include a golf course identifier (ID) 29, such as a name, code, number, etc. operable to identify a respective set of golf course information. Furthermore, optionally, golf course information 28 may include information relating to golf course location 31, such as a geographic point and/or area corresponding to the physical location of the respective golf course, address information, etc. Further, golf course information 28 includes golf hole information 70 files for the holes, nine, eighteen or the like, associated with the golf course. The hole information 70 files may include target information files 30 that include information related to the targets for a specific hole, such as the target location 32. Targets may include, but are not limited to the golf cup/hole, greens, hazards, such as water hazards, bunkers, trees, out-of-bounds and the like. Locations of such targets may be defined by an exact location, such as for the golf cup, a tree and the like, or locations may be defined in terms of area boundaries (front, back, left side, right side, etc.), such as for greens, water hazards, bunkers, out-of-bounds and the like. For stationary or non-mobile targets, such as greens, hazards and the like, the golf course information 28 files may include target locations 32 that are static and do not change over time. For transitory targets, such as golf cups/holes 36 and the like, the golf course information files 28 may be frequently updated with new target locations 32. The new target locations 32 for transitory targets will be received from internal or external PDE 18, which determines asset tag locations 46 associated with the transitory target.

In some aspects, the rangefinder module 50 of rangefinder server 20 may optionally include rangefinder logic 24 operable for determining target distance 26 based on target location 32 and wireless device location 48. Rangefinder logic 24 may be included in the rangefinder server 20 in lieu of the rangefinder logic 24 being included in the wireless device 12 or the rangefinder logic 24 may be included in the rangefinder server 20 as a back-up option to the rangefinder logic 24 included on wireless device 12.

Optionally, in some aspects, rangefinder module 50 may include coursefinder logic 23 operable to identify a respective one of the golf course information 28 to forward to a requester, including but not limited to wireless device 12 executing rangefinder application 22. In some aspects, coursefinder logic 23 is operable to determine a desired one of the golf course information 28 based on matching a received golf course information request 33 having a desired golf course identification 27 with the corresponding golf course ID 29 and/or the corresponding golf course location 31. Desired golf course identification 27 may include a name, a number, an address, and/or any other information usable to identify a golf course. In another aspect, coursefinder logic 23 is operable to determine a desired one of the golf course information 28 based on matching a received golf course information request 33 having a wireless device location 48 with the corresponding golf course location 31. For example, upon launching rangefinder application 22 (FIG. 3) on wireless device 12 (FIG. 3), the rangefinder application 22, such as via rangefinder logic 24, may automatically obtain wireless device location 48 for inclusion within an automatically generated golf course information request 33. Upon receipt, coursefinder logic 23 may then search the plurality of golf course information 28 until a golf course is found having golf course location 31 matching with or within a predetermined vicinity of wireless device location 48. In any case, upon selecting golf course information 28 based on received golf course information request 33, coursefinder logic 23 is operable to initiate forwarding the respective golf course information to the respective requester.

Additionally, in some aspects, PDE 18 may optionally be internally included in rangefinder server 20. The PDE includes a position/location application 114 operable to determine asset tag location 46 and/or wireless device location 48. In those aspects in which rangefinder server 20 includes PDE 18, rangefinder server 20 may additionally be in wireless communication with asset tags 16. As such, the PDE is operable to determine the asset tag location 46, which may be based on satellite information received by the asset tags 16 and forwarded to the PDE 18 and other location determining information, such as timing information, received from the asset tags 16. In some aspects, such as aspects that implement GPS MS-assisted mode location determination, the internal PDE 18 may additionally be configured to determine wireless device location 48, which may be based on satellite information received by the wireless device 12 and forwarded to the PDE 18 and any other location determining information forwarded from the wireless device 12. Alternatively, such as in those aspects that implement GPS MS-based mode location determination, the internal PDE 18 may provide the wireless device 12 with information that assists the wireless device 12 in determining the wireless device geographic location.

Figure 5:
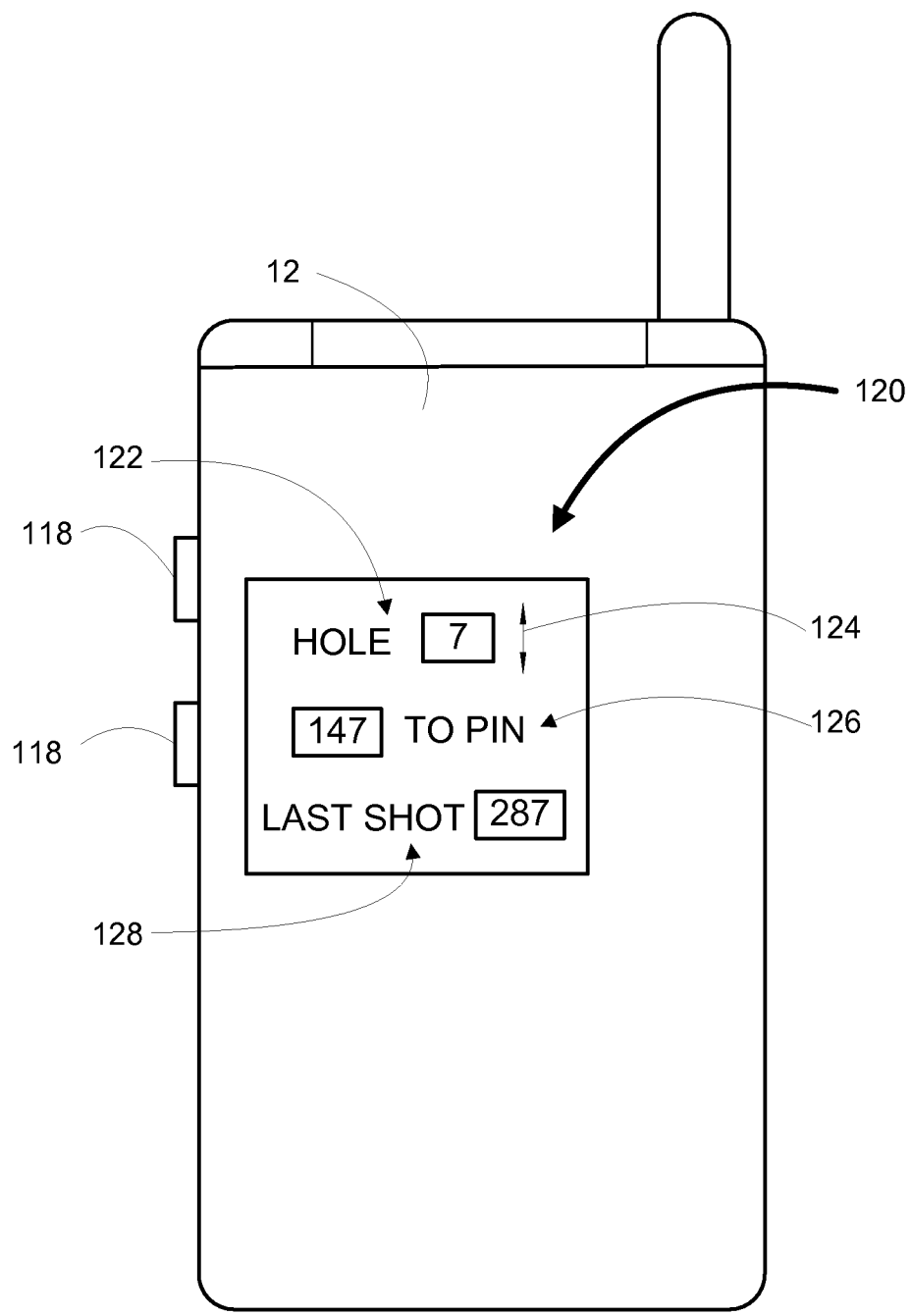
FIG. 5 is an illustrative example of an exterior display on a wireless communication device providing distance to golf course hole information, according to an aspect.
Figure 6:
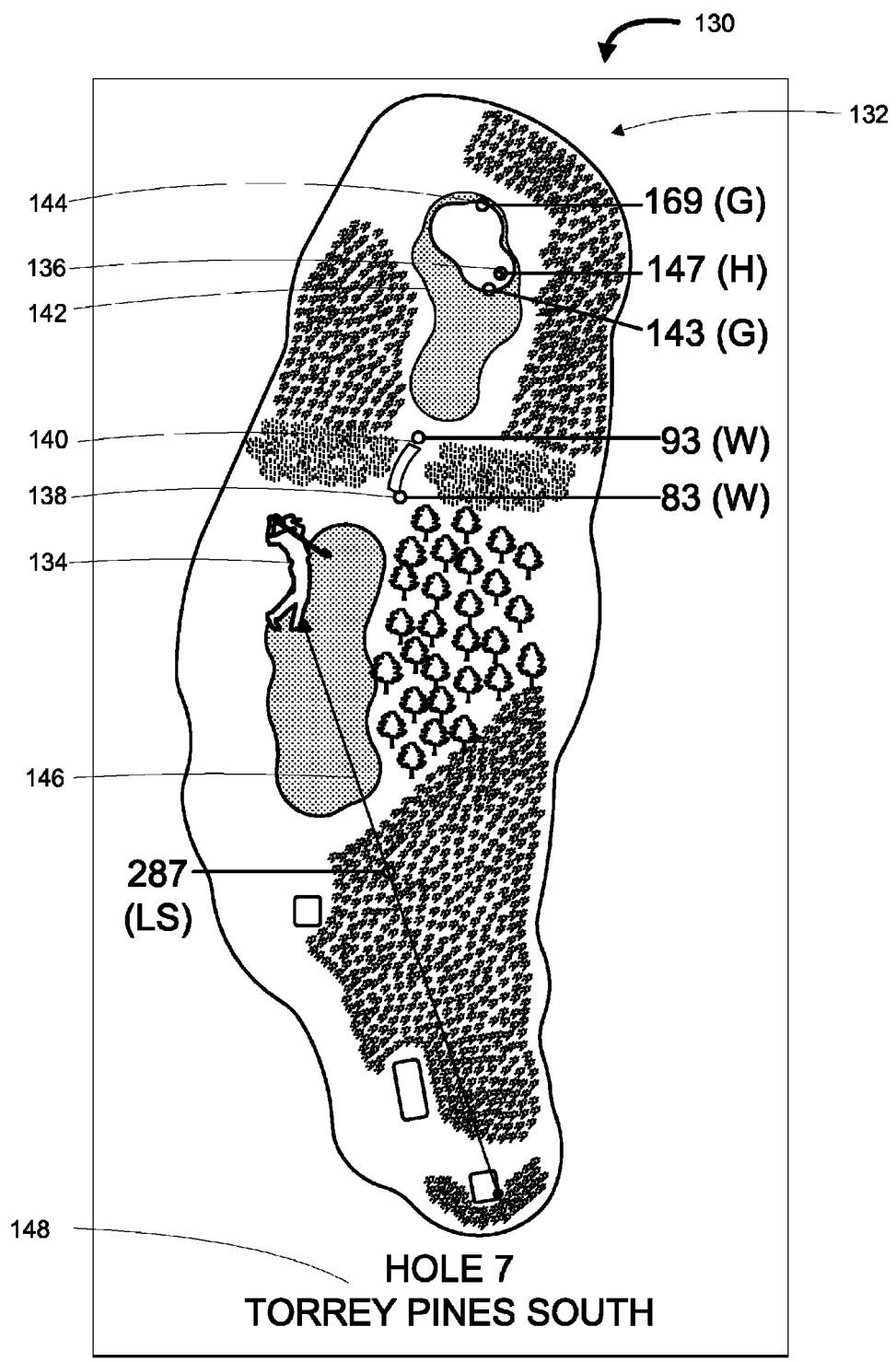
FIG. 6 is an illustrative example of a display on a wireless communication device providing a golf course hole overview, distance to the golf course hole and distance to selected targets associated with the hole, according to an aspect.

FIGS. 5 and 6 illustrates an example of a wireless device 12 presenting a first mode of target distance information and a second mode of target distance information, according to present aspects. FIG. 5 illustrates the first mode of operation, in which the golf course distance measuring application automatically presents first mode presentation 120. Alternatively, the first mode of operation may be initiated by the golfer/user providing an input to a designated keypad or button 118, and the device 12 responses with a first mode presentation 120. The first mode presentation 120 includes, a display of the golf hole number 122, an optional arrow icon 124, distance to the pin (i.e., golf cup and/or flagstick) 126 and an optional distance from the last shot 128. The golf hole 122 indicates the hole currently being played or the hole to which distance to the cup is currently being determined. The arrow icon 124 indicates that the displayed hole can be changed by providing an input to the wireless device. For example, a specified user input to a designated keypad or button 118 may provide for a change in the hole number displayed. It should be noted that changing the hole number displayed corresponds with a change in the distance to the pin 126. In the illustrated example of FIG. 5, the distance to the pin 126, indicates "147 to the pin," and last shot distance 128, indicates "last shot 287." Additionally, the first mode presentation may include other optional information (not shown in FIG. 5), for example, the name of the golf course currently being played or the like.

In the illustrated example of FIG. 5, the first mode presentation 120 is displayed on an external display of wireless device 12. As shown, wireless device 12 may comprise a cellular telephone and in particular a flip-type cellular telephone. The flip-style cellular telephone includes an external display that may be operable for displaying the first mode presentation 120. The external display of a flip-style cellular telephone may be smaller than the internal display and therefore less data can be presented on the external display.

Additionally, in the illustrated example of FIG. 5 the distance to the pin 126 and the distance from the last shot 128 are provided for in terms of yards as a unit of measurement. However, the application 22 may be configurable to allow for the distance information to be presented in any desirable unit of measurement, for example, yards, feet, inches, meters, centimeters, or the like.

FIG. 6 illustrates the second mode of operation, which may be automatically or manually displayed in the internal display of a flip-style cellular phone, or on a single display by providing a user input, such as an input to a designated keypad or button, according to one aspect. The second mode presentation 130 may include an overview of the golf hole 132 being played, the approximate location of the golfer 134 on the hole, distance to the golf cup/hole 136, and distance to various other targets on the hole. For example, the second mode presentation 130 includes the distance to the golf cup/hole 136, indicated as "147 (H)", where "147" represents the distance in yards and where "(H)" represents the target, e.g., the "hole" in this instance. Further, for example, the second mode presentation 130 may include: the distance to the front of a water hazard 138, indicated as "83 (W)", where "83" represents the distance in yards and where "(W)" represents the target, e.g., the "water hazard" in this instance; the distance to the back of the water hazard 140, indicated as "93 (W)"; the distance to the front of the green 142, indicated as "143 (G)", where "143" represents the distance in yards and where "(G)" represents the target, e.g., the "green" in this instance; and the distance to the back of the green 144, indicated as "169 (G)". Additionally, the second mode of operation may include the distance from the last shot 146, where "287" represents the distance in yards and where "LS" represents the last shot. Other target distances may also be presented in the second mode presentation 130, as dictated by the hole being played. Additionally, second presentation mode 130 may optionally include other golf course information 148, such as the golf course hole number and the golf course name, indicated as "Hole 7 Torrey Pines South" in this instance.

FIG. 7 illustrates an example of a directional vector being displayed on a wireless device display 150, according to one aspect. The directional vector 152 provides the golfer/user with the direction to the intended target, in this instance, the intended target is the golf cup/hole 154. As previously discussed, direction to the intended target may be helpful if the golfer/user is facing a "blind" shot that has no line-of-sight to the intended target. In the illustrated example of FIG. 7, the directional vector 152 may be overlaid on an overview/representation of the current hole 156 being played, and the display may further include a representation of the location of the golfer 158 on the hole. In alternate aspects, the directional vector may be represented in the form of a compass-type view. In the illustrated example of FIG. 7, overlaying the direction vector 152 on the representation of the current hole 156 allows the golfer/user to determine other targets or hole features, such as bunkers, water hazards, trees, etc., along the directional vector 152 that may need to be taken into account in making shot. Further, as the wireless device is moved about by the golfer/user, either the overview of the current hole 156 or the directional vector 152 will move accordingly to accurately depict the direction vector 152 in relation to the golfer 158 and the intended target 154. Further, the presentation of the directional vector 152 and the distance measurements as illustrated in FIG. 6 may be presented together to allow the golfer/user to determine distance to the golf cup and/or any other targets between the golfer/user and the hole. For example, in FIG. 7 the directional vector mode presentation 150 includes optional distance measurements for the golf cup 160, indicated as "247 (H)", where "247" represents the distance in yards and where "(H)" represents the target, e.g., the "hole" in this instance. Additionally, the directional vector mode presentation 150 includes optional distance to the front of a water hazard 162, indicated as "183 (W)", where "183" represents the distance in yards to the from of the water hazard and where "(W)" represents the target, e.g., the "water hazard" in this instance; the distance to the back of the water hazard 164, indicated as "193 (W)". Optionally, the directional vector display 150 may optionally include other golf course information 166, such as the golf course hole number and the golf course name, indicated as "Hole 7 Torrey Pines South" in this instance.

Figure 8:
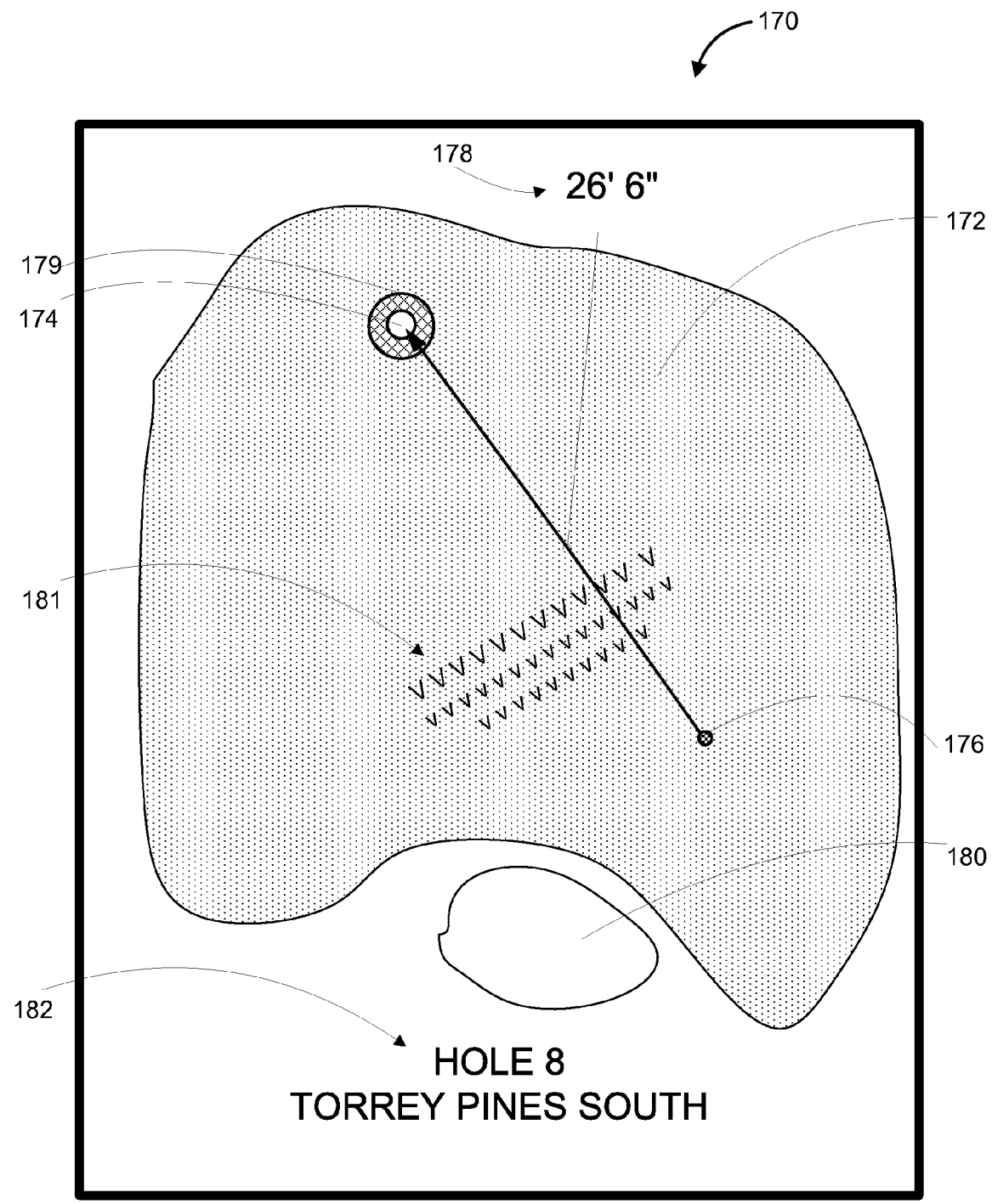
FIG. 8 is an illustrative example of a display on a wireless communication device providing a golf course green overview and distance to the golf course hole, according to an aspect.

Referring to FIG. 8, another example of a display of golf course distance information presented on a wireless device is depicted, according to another aspect. The illustrated display shows a golf green presentation mode 170 that depicts a golf green overview 172 of the current golf green being played. As previously noted, the application 22 may include geofencing technology or any other mechanism that allows for predetermined geographic areas to be zoned for predetermined purposes. As previously noted, the golf green may be geofenced or zoned to indicate when a wireless device, in possession of a golfer, departs a green to begin the next hole. Such indication may be used by the application to allow the application to move to the next hole in terms of obtaining and presenting distances to the next golf cup and distances to predetermined targets on the next golf hole. In other aspects, geofencing or zoning may be used to indicate when the wireless device, in possession of the golfer/user, enters the golf green or the area surrounding the green, so as to provide for the display of the golf green presentation mode 170. Alternatively, the application 22 may be configured to provide for user inputs to request the display of the golf green presentation mode 170.

In addition to the golf green overview 172, the golf green presentation mode 170 may include a golf cup icon 174 that indicates the approximate location of the golf cup on the golf green 172, a golf ball icon 176 that indicates the current approximate location of the golfer's golf ball on the green (based on positioning the wireless device directly over the golf ball location) and indicates the distance to the cup 178, indicated as 26 feet 6 inches (26'6"). As previously noted, the application 22 may be configurable in terms of the units of measurement that are displayed. In certain aspects, the application 22 may provide for geographic location determination and, thus, distance determination that may be accurate for foot or inch increment unit measurements. In certain aspects, asset tags 16 may be limited in terms of accuracy and therefore the exact location of the golf cup 174 on the golf green 172 may have a certain level of inaccuracy. The golf green presentation mode 170 may depict the level of accuracy, in terms of an illustration and/or a number representing the level of accuracy for the displayed golf cup 174 location. In FIG. 8, the circle 179 surrounding the reported golf cup 174 location indicates the level of confidence that the golf cup 174 is actually located at the location as displayed. Thus, in this instance, the bigger the circle 179 the higher the level of certainty that the location of the golf cup 174 is inside the circle 179. It should be noted, that the accuracy of the golf cup 174 may vary from hole to hole and, therefore, the circle 179 or any other marking/designator may vary, as well. In other aspects, the golf green presentation mode may display a number, in terms of a percentage, for the accuracy or inaccuracy of the current golf cup location or any other markings/depictions may used to indicate the accuracy of the golf cup location.

Additionally, the golf green presentation mode may include other monuments or predetermined hazards/targets surrounding the golf green, such as bunker 180 or the like. In this regard, the golf green presentation mode 170 may be presented on the device, either automatically or at the request of the golfer/user, anywhere on the golf course, such as if the golfer/user is in the fairway, adjacent to the green, or in or near a hazard/target that is proximate to the green. Moreover, the golf green presentation mode may include additional golf course information 182, such as the hole number and the golf course name, indicated in the illustrated aspect as "Hole 8, Torrey Pines South." Additionally, the golf green presentation mode 170 may include gradient markings 181, such as shading, directional arrows, symbols or any other marking on the golf green overview 172 to indicate the gradient or slope of the green. Gradient markings 181 are beneficial to the golfer/user in "reading" the green for an impending approach shot, chip, and/or putt.

Figure 9:
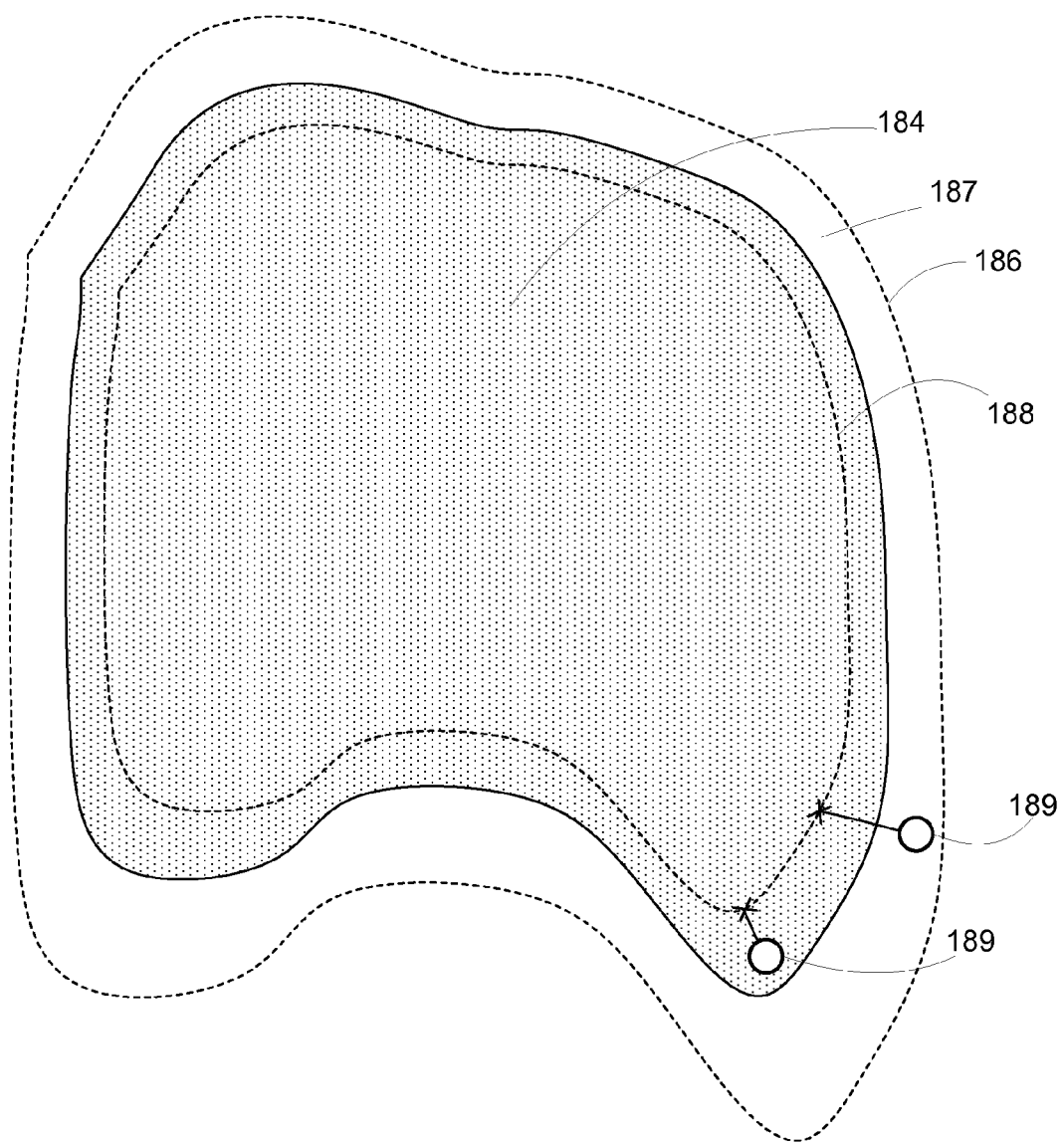
FIG. 9 is an illustrative example of the concept of geofencing in relation to a golf course green, according to an aspect.

Turning attention to FIG. 9, an example is provided of the geo-fencing concept in relation to a golf course green, according to another aspect. The golf course green 184 is illustrated in FIG. 9 as the shaded region. The rangefinder application on the wireless device (not shown in FIG. 9) and/or the rangefinder module on the network server (not shown in FIG. 9) may define a first geo-fence 186 that encompasses the golf course green 184 and a predetermined region 187 surrounding the golf course green. While the predetermined region 187 is depicted in FIG. 9 as lying only a short distance from the golf course green 184, the predetermined distance 187 is configurable and may extended well beyond the green to any area. The first geo-fence 186 may be operable to define the region in which the rangefinder application will switch from providing a golf course hole overview presentation (e.g., 130 of FIG. 6) to a golf hole green presentation (e.g., 170 of FIG. 8). For example, if the wireless device is outside of the boundaries of first geo-fence 186, the wireless device may be provided a golf course hole overview presentation 130 and if the wireless device is inside the boundaries of first geo-fence 186, the wireless device may be provided a golf hole green presentation 170).

The rangefinder application may further define a second geo-fence 188 that encompasses an area just inside the perimeter of the golf hole green 184. The second-geo-fence 184 may be operable to define an area in which movement of the golf cup within the geo-fenced area triggers a location determination and movement outside of the geo-fenced area does not trigger a location determination. As such if the golf cup is moved to a new location on the green, a new location determination will occur. However, if the golf cup is moved outside of the green or outside of the prescribed minimum distance from green edge limit for making a hole, no location determination will occur. For example, if the golf cup is moved outside of the green for the purpose of re-charging the asset tag battery, no location determination will occur.

Additionally, the placement of golf cup holes is generally limited to being within a prescribed distance from the edge of the golf hole green. For example, many golf courses dictate that the hole be at least 6 to 7 feet from the edge of the green. Thus, if the system returns a golf cup location that is outside of the prescribed limits for golf cup placement, it can be assumed that the location is inaccurate. In this regard, second-geo-fence 184 may be operable to define an error correction factor, such that golf cup locations that are predicted to be outside of the second geo-fence 188 may be adjusted a prescribed distance. The prescribed distance may be the shortest distance from the predicted golf cup location to the perimeter of the second geo-fence. For example, in FIG. 9 if the golf cup 189 is predicted to be outside of the second geo-fence 188, the predicted location can be adjusted/moved to the closest position on the perimeter ("X") of the second geo-fence 188 to reduce the inaccuracy of the location determination. In other aspects, in which the direction of the inaccuracy can be assessed, the prescribed distance may be some other point along the perimeter of the second geo-fence 188.

As previous noted in determining the distance from the golfer/wireless device to the golf cup or any other golf course target, accuracy of the distance is a paramount concern. Therefore, in certain aspects, location determination methods may be employed that emphasize the accuracy of the location. For example, in one aspect, increasing the Quality of Service (QoS) of the location determination provides for a more accurate location determination. In most instances, increasing QoS results in a deeper or otherwise longer period of time for a "fix" to be returned. Therefore, increasing the QoS may be more applicable to stationary targets, such as the golf cup or other golf course targets as opposed to the wireless device, which may be non-stationary during the location determination process. In other aspects, multiple fixes may be taken within a predetermined period of time for a wireless device and/or a golf course target and data smoothing performed of the resulting location determinations to result in a more accurate location determination. Various filtering mechanisms, such as Kalman filtering or the like, may be employed to provide the necessary data smoothing.

Figure 10:
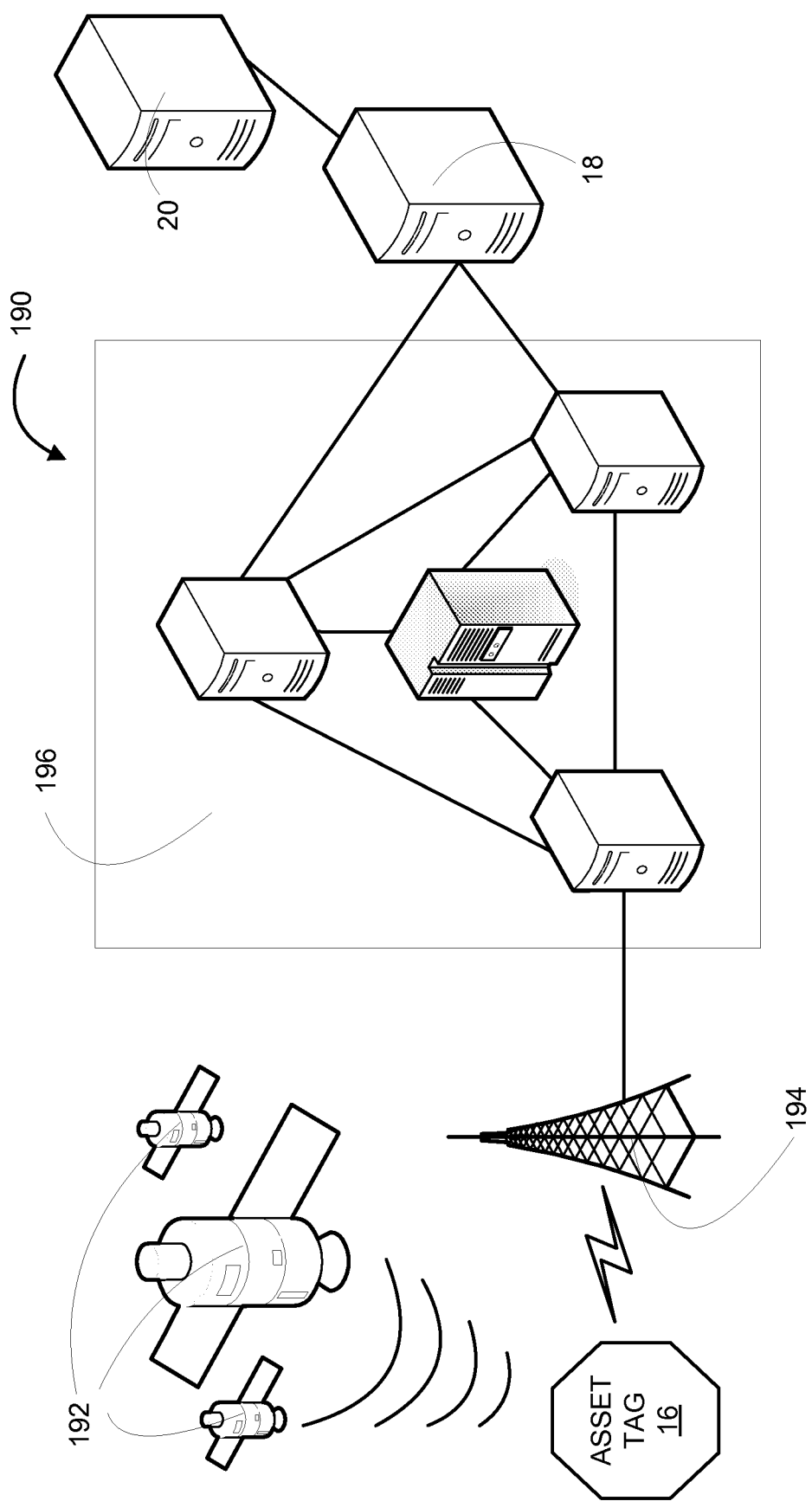
FIG. 10 is a block diagram of the network architecture for determining the location of an asset tag, according to another aspect.

Referring to FIG. 10, a block diagram depicts the network architecture 190 for location determination of asset tags, in accordance with one example of the present aspects. The asset tags 16 may support an over-the-air protocol that leverages Short Message Service (SMS) and Code Division Multiple Access (CDMA) packet data services, although other messaging and packet data protocols may be utilized. The asset tags 16 are configured to receive location/position determining signals from one or more positioning entities, such as communication network-based entities and/or a plurality of location determining satellites 192, such as GPS satellites or the like. In one aspect, for example, the asset tags wirelessly transmit the satellite signals or network-based signals, the asset tag identifier and other location determining related information, to Radio Access Network (RAN) 194. The RAN 194 is in wired communication with the carrier core network 196, which includes multiple servers and load balancing capabilities. The carrier core network 196 transmits the location determining information to the position determining entity (PDE) 18, which is operable to determine the location of the asset tag. The PDE 18 is in communication with the rangefinder server 20, which receives the locations of the asset tags, correlates the asset tag locations to target locations, and stores the target locations in associated golf course information files.

Figure 11:
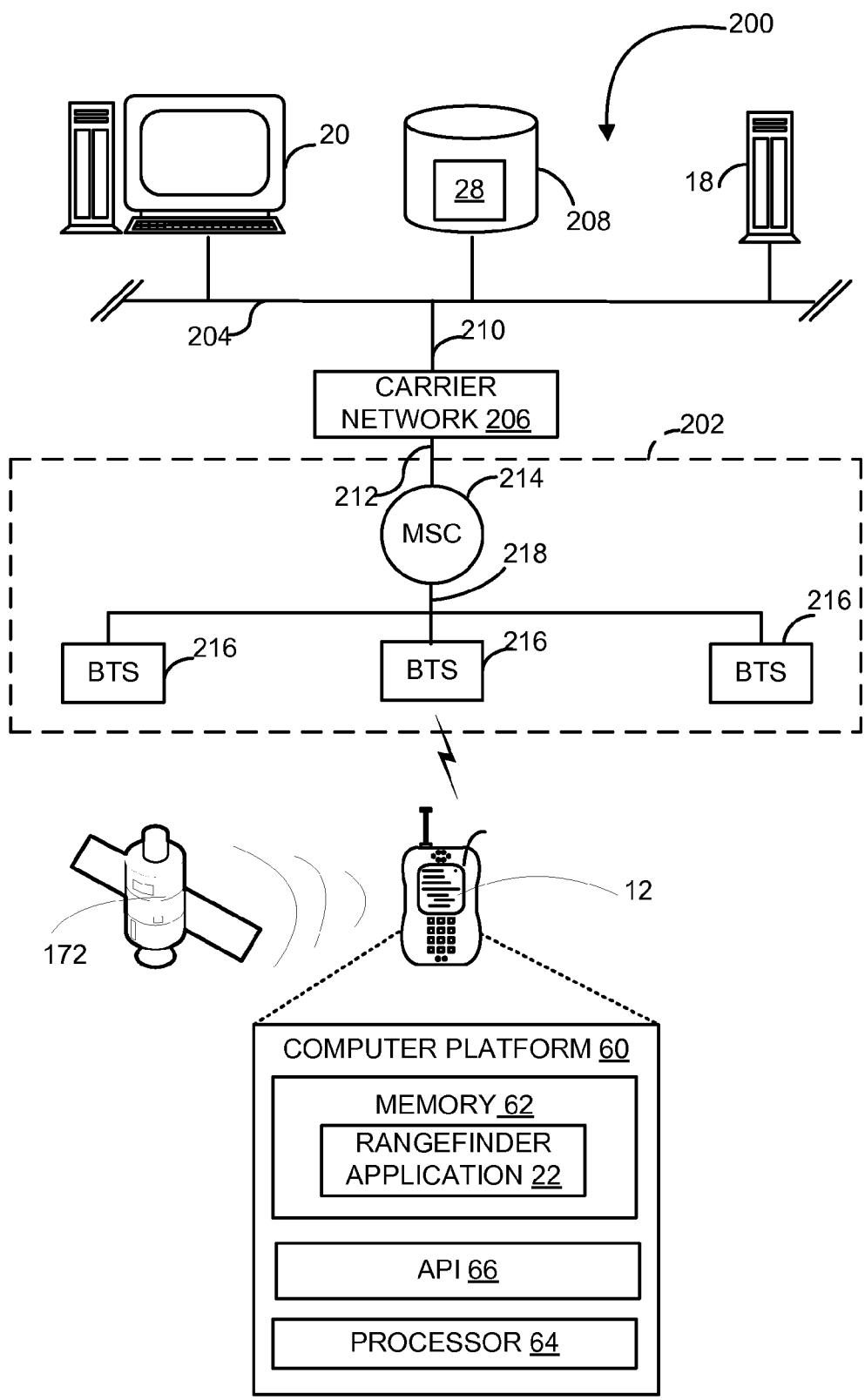
FIG. 11 is a block diagram of a cellular network implemented by the wireless device for communicating with the rangefinder server, according to an aspect.

Referring to FIG. 11, a block diagram representation of a cellular network 200 is depicted, according to one aspect. Wireless device 12 may utilize the cellular network to communicate with rangefinder server 20 and, optionally, PDE 18. A wireless network 202 may comprise a cellular network 200 and, as such may be implemented to communicate golf course information 28 including target locations 32 to the wireless device 12. Referring to FIG. 11, in one aspect, wireless device 12, such as a cellular telephone, is configured to communicate via the cellular network 200. The cellular network 200 provides wireless communication device 12 the capability to communicate and receive location determining information to the PDE 18 and receive golf course information 28 including target locations 32 from the rangefinder server 20. The cellular telephone network 200 may include wireless network 202 connected to a wired network 204 via a carrier network 206. FIG. 11 is a representative diagram that more fully illustrates the components of a wireless communication network and the interrelation of the elements of one aspect of the present system. Cellular telephone network 200 is merely exemplary and can include any system whereby remote modules, such as wireless communication device 12 communicate over-the-air between and among each other and/or between and among components of a wireless network 202, including, without limitation, wireless network carriers and/or servers.

In network 200, rangefinder server 20, can be in communication over a wired network 204 (e.g., a local area network, LAN). Further, a storage device 208, which stores golf course information 28 files, may be in communication with rangefinder server 20 via the wired network 204. Additionally, PDE 18, which determines location of asset tags and, optionally the wireless device, may be in communication with the rangefinder server 20 and/or storage device 208 via the wired network 204. Rangefinder server 20 may communicate, to wireless device 12, the golf course information 28 files including target locations 32, and receive target location data from and PDE 18. Rangefinder server 20, storage device 208, and PDE 18 may be present on the cellular telephone network 200 with any other network components that are needed to provide cellular telecommunication services. Rangefinder server 20, storage device 208, and PDE 18 communicate with carrier network 206 through a data links 210 and 212, which may be data links such as the Internet, a secure LAN, WAN, or other network. Carrier network 206 controls messages (generally being data packets) sent to a mobile switching center ("MSC") 214. Further, carrier network 206 communicates with MSC 214 by a network 212, such as the Internet, and/or POTS ("plain old telephone service"). In network 212, a network or Internet portion transfers data, and the POTS portion transfers voice information. MSC 214 may be connected to multiple base stations ("BTS") 216 by another network 218, such as a data network and/or Internet portion for data transfer and a POTS portion for voice information. BTS 216 ultimately broadcasts messages wirelessly to the wireless communication devices 12 and 16, by short messaging service ("SMS"), or other over-the-air methods.

Figure 12:
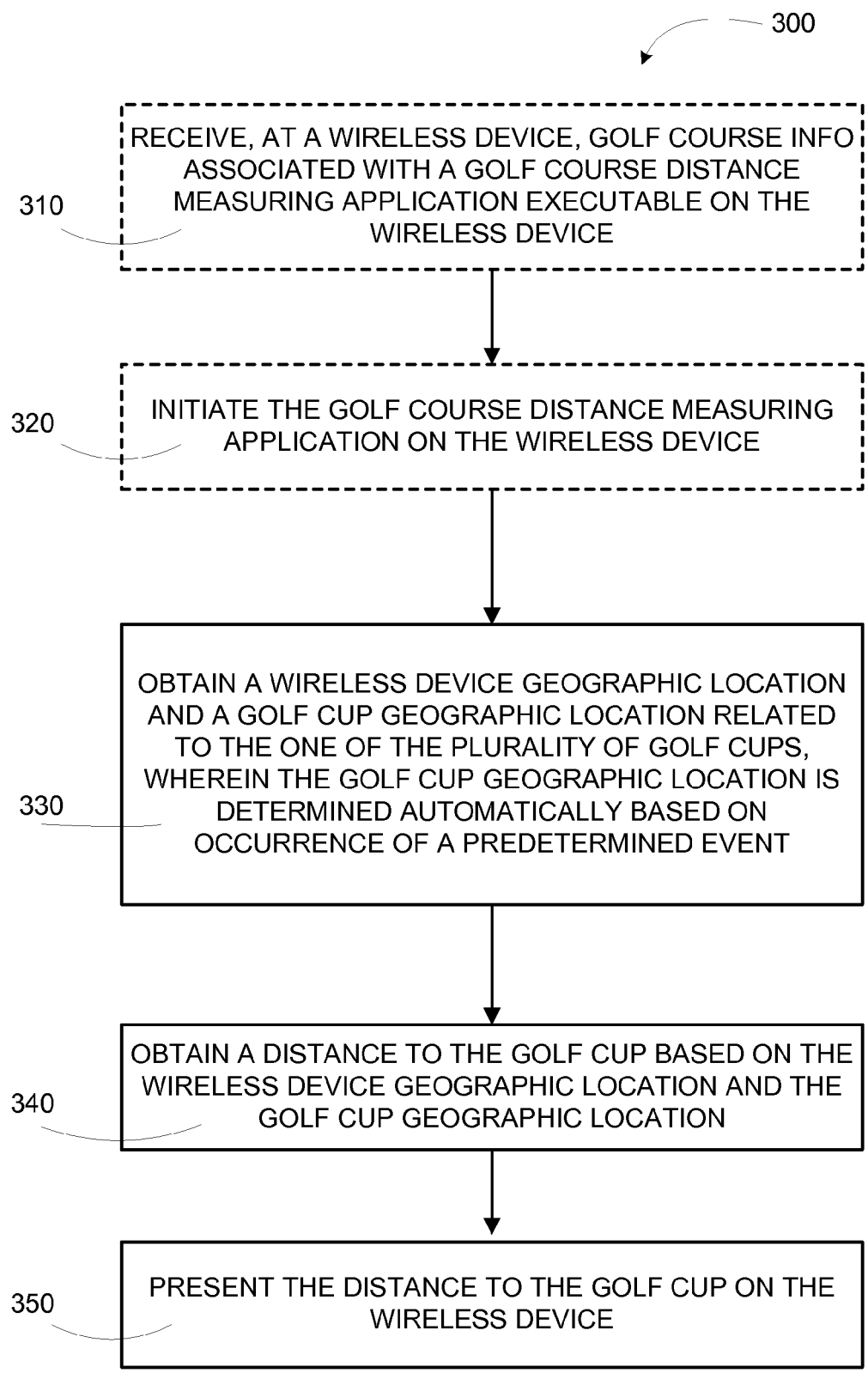
FIG. 12 is a flow diagram of a method for determining a distance to a golf cup on a golf course, according to an aspect.

Referring to FIG. 12, a flow diagram 300 is presented of a method for determining a distance to a golf cup on a golf course, according to one aspect. At optional Event 310, a wireless device receives golf course information associated with a golf course distance measuring application that is executable on the wireless device. The golf course information may include the geographic location of the plurality of golf cups located on the golf course. Wireless receipt of the golf course information allows the golfer/user to obtain such information without requiring the downloading of such information via a wired connection. In this regard, the golfer/user may receive the golf course information just prior to the round of golf, for example, while on route to the golf course or while standing on the first tee box. As previously noted, one or more of the present aspects may provide for the golf course information to be automatically received (i.e., downloaded) by the wireless device when the device is in the vicinity of a golf course that is configured for golf course target distance measuring in accordance with present aspects. The wireless device may implement a location determination mechanism, such as GPS, AFLT, or the like, to determine the device's location, which in turn is communicated wirelessly to the rangefinder server, which recognizes the location as being within a geofenced or predetermined zoned area of a golf course, thus triggering automatic communication of the golf course information.

At optional Event 320, the golf course distance measuring application is initiated on the wireless device. Initiating of the golf course measuring application may coincide with the start of a round of golf. Initiation of the golf course measuring application may provide for predetermined keypad or button input functions to be replaced with predetermined golf course distance measuring application functions.

At Event 330, wireless device geographic location and golf cup geographic location are obtained. The determination of the golf cup location is automatic based one the occurrence of an event, such as a predetermined event or the like. An example of an event that automatically triggers location determination includes sensing a predetermined level of motion in the golf cup, such as when the golf cup is moved to a new location on the green. In one specific aspect, asset tags may be located proximate the golf cup, such as affixed to the golf cup, the flagstick or the flag attached to the flagstick, and the asset tag includes motion sensors capable of initiating the location determination process based on sensing a predetermined level of motion. Another example of an event that automatically triggers location determination includes the occurrence of a predetermined set time. For example, one or more set times may be times subsequent to a scheduled time for moving the golf cup on a golf course green.

In yet another example of an event that triggers location determination, a remote trigger may be received by the asset tag associated with the golf cup. For example, a remote trigger may be sent from the wireless device that results in golf cup location determination and wireless device location determination occurring at substantially the same point in time. Substantially the same point in time may include any time range that results in the predicted golf cup location and the predicted wireless device location having substantially the same level of inaccuracy. In those aspects, in which the event is a remote trigger, the location determination that results from the remote trigger may be used in conjunction with another location determination associated with another event, such as sensing a predetermined level of motion, time of day or the like. In such aspects, the location determination that results from the remote trigger is used to increase the accuracy of other location determination. As previously noted, the golf course distance measuring application may use the previously downloaded golf course information to obtain the location of the golf cup or other golf course targets. Alternatively, initiation of the request to obtain the distance to the cup may provide for wirelessly communicating with a network device, such as a rangefinder server, that stores current golf cup geographic location.

Obtaining the wireless device geographic location may provide for executing any known or future known method for location determination. Examples of known GPS-based methods include, but are not limited to a Mobile Station (MS)-Based mode, Mobile Station (MS)-Assisted mode, and Standalone mode, a Differential Global Positioning System (DGPS)-based location-determination mode or the like. Examples of known network-based methods include, but are limited to AFLT, E-OTD and the like.

Obtaining a wireless device geographic location and a golf cup geographic location may optionally additionally include obtaining the geographic location to one or more predetermined golf course targets associated with the golf cup. Examples of predetermined golf course targets include green boundaries, hazard boundaries, such as water hazard boundaries, bunker boundaries, out-of-bounds markings and the like. Geographic locations of the predetermined golf course targets may be obtained from the golf course information or, alternatively, the location of the predetermined golf course targets may be obtained by wirelessly communicating with a network device, such as a rangefinder server, that stores the location of the predetermined golf course targets.

At Event 340, a distance to the golf cup is obtained based on the wireless device geographic position and the golf cup geographic position. In one aspect, obtaining the distance to the golf cup may include determining, at the wireless device, the distance to the golf cup based on the wireless device geographic location and the golf cup geographic location. Alternatively, in another aspect, obtaining the distance to the cup may include communicating with a wireless network device, such as a rangefinder server or the like, to obtain the distance to the cup based on the wireless device geographic location and the golf cup geographic location. Optionally, in the aspects in which locations of predetermined golf course targets are obtained, the method may include obtaining the distance to the one or more predetermined golf course targets based on the wireless device geographic location and the geographic location of the one more predetermined golf course targets.

At Event 350, the distance to the golf cup is presented on the wireless device. Presentation of the distance may include presenting the distance on an output mechanism, such as a display, a speaker, and/or a Personal Area Network (PAN) transceiver associated with a PAN headset, such as a Bluetooth® headset or the like. Additionally, in those aspects in which distance to the predetermined golf course targets is determined, presentation may additionally include presentation of the distance to the one or more predetermined golf course targets. In one specific aspect, presentation may include a first display that includes at least distance to the golf cup and a golf course hole number associated with the golf cup and/or a second display that includes at least an overview of a golf course hole layout associated with the golf cup and distance to the one or more predetermined golf course targets.

Additionally, the method described in FIG. 12 may optionally include obtaining an elevation gradient based on the wireless device geographic location and the golf cup geographic location and presenting the elevation gradient on the wireless device. Similarly, the method may optionally include obtaining environmental parameters associated with current environmental conditions and presenting the environmental parameters on the wireless device in conjunction with presentation of the distance to the cup. The environmental conditions may include, but are not limited to, wind direction, wind speed, humidity, temperature, and the like.

In another alternate aspect of the method described in relation to FIG. 12, the method may optionally include determining a directional vector based on the wireless device geographic location and the golf cup geographic location and displaying the directional vector on the wireless device. Another alternate option includes communicating the distance to the golf cup to a remote assistance service and receiving a golf swing advice communication (i.e., a golf tip) from the remote assistance service.

Figure 13:
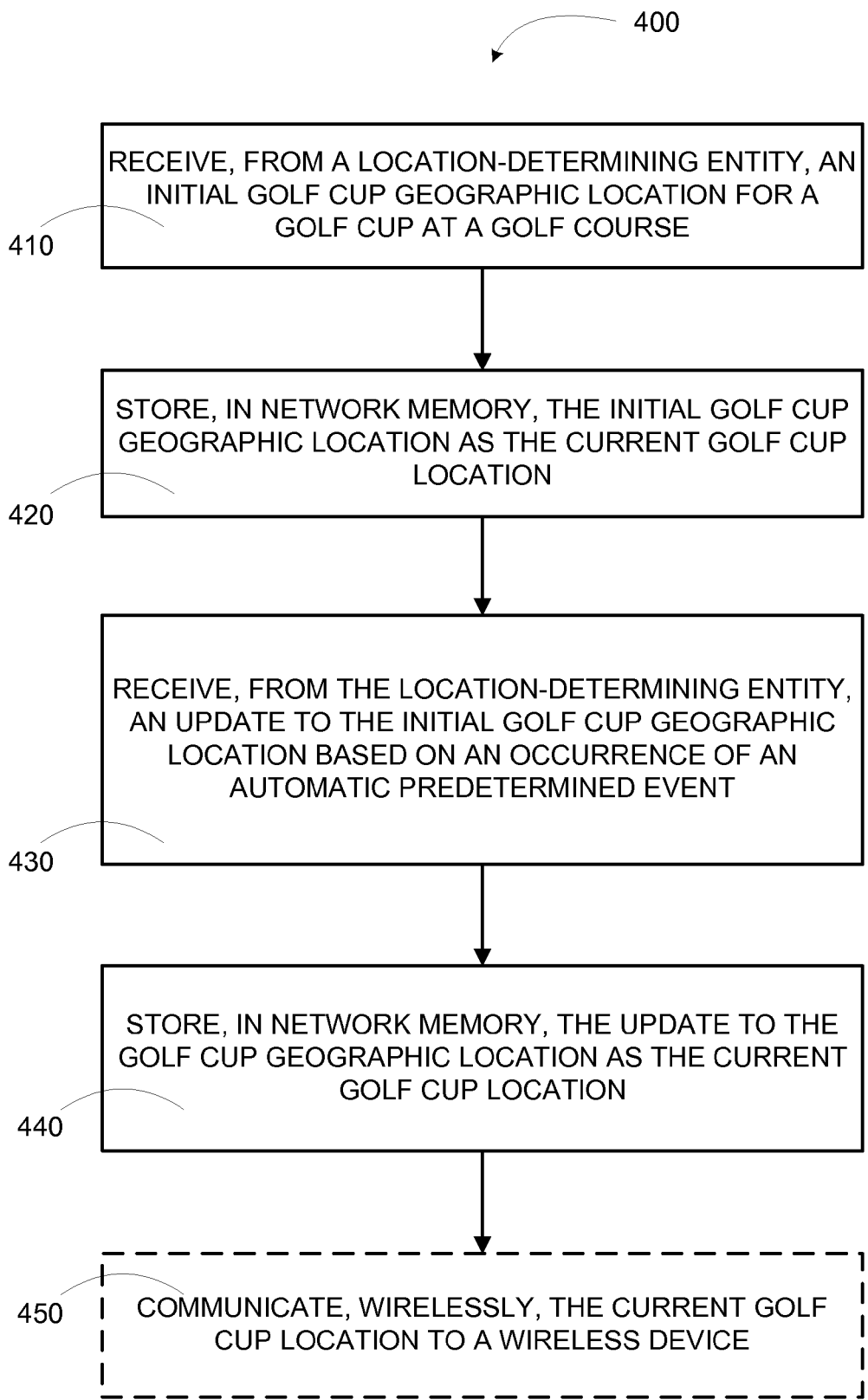
FIG. 13 is a flow diagram of a method for obtaining the location of a golf cup on a golf course, according to another aspect.

Referring to FIG. 13, a flow diagram 400 is depicted of a method for obtaining the current location of a golf cup/hole on a golf course, according to one aspect. At Event 410, an initial golf cup geographic location for a golf cup hole at a predetermined golf course is received from a location-determining entity. In some aspects, the geographic location of the golf cup may be determined at the location-determining entity based on satellite signals or wireless network signals received and forwarded from an asset tag associated with the golf cup. The location-determining entity may use any known or future known method for location determination. Examples of known GPS based methods include, but are not limited to a location-determination mode, such as Mobile Station (MS)-Based mode, Mobile Station (MS)-Assisted mode, and Standalone mode, a Differential Global Positioning System (DGPS)-based location-determination mode or the like. Examples of known network-based methods include, but are not limited to AFLT, E-OTD or the like. Additionally, the method may optionally receive from the location-determining entity, geographic locations for one or more predetermined targets associated with the golf cup.

At Event 420, the initial golf cup geographic location is stored in network memory as the current golf cup location. In some aspects, the golf cup location may be stored in an associated golf course information file. In those aspects, in which geographic location to one or more predetermined targets are received, the locations of the targets are stored in network memory.

At Event 430, an update to the initial golf cup geographic location is received from the location-determining entity based on the occurrence of an automatic event, such as a predetermined event or the like. In some aspects, the automatic event that initiates determination of the golf cup location is sensing of a predetermined level of motion in the golf cup. In one specific aspect, asset tags are located proximate the golf cup, such as affixed to the golf cup, the flagstick or the flag attached to the flagstick, and the asset tag includes motion sensors capable initiating the location determination process based on sensing a predetermined level of motion.

Another example of an automatic event includes the occurrence of a predetermined time of day. The time of day coinciding with a time that follows a scheduled time for moving the golf cup to a different location on a golf course green.

In yet a further aspect, the event may include receipt of a remote trigger by an asset tag associated with the golf cup. The remote trigger may be initiated by a user input to an input mechanism on the wireless device. In one aspect, the remote trigger initiates location determination at the asset tag at substantially the same point in time in which a wireless device location determination is performed. By performing the golf cup location determination and the wireless device location determination at substantially the same point in time, inaccuracies related to the positioning of satellites are generally equivalent in degree for both location determinations.

At Event 440, the updated to the golf cup geographic location is stored in network memory as the current golf cup location.

At optional Event 450, the current golf cup geographic location is wirelessly communicated to a wireless device. The current golf course location is communicated in conjunction with a request for communication of the golf course information file, which may additionally include the locations of the one of more predetermined targets associated with the golf cup. Alternatively, the current golf course location may be communicated separately, in response to a request to initiate golf cup distance determination, to insure that the wireless device has current golf cup location data.

In an alternate aspect of the method as described by FIG. 13, the method may optionally include receiving a current wireless device geographic location from a wireless device, determining a distance to the golf cup based on the current wireless device geographic location and the current golf cup geographic location and communicating the distance to the cup to the wireless device. An additional alternate aspect may provide for optionally receiving a current wireless device geographic location from a wireless device, determining a distance to the one or more predetermined targets based on the current wireless device geographic location and the geographic location of the one or more targets and communicating the distance to the one or more targets to the wireless device.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

Thus, present aspects provide for devices, apparatus, systems, methods, and computer program products for determining distances to predetermined targets, such as targets on a golf course using a wireless communication device, such as a cellular telephone. Cellular telephone implementation allows for existing devices to be configured with the requisite application to provide the golf course distance measuring capabilities according to the present aspects. Present aspects provide for accurate and automated determination of the distance to the target, such as a golf cup. Current aspects may use the Global Positioning System (GPS) to determine the distance to the desired target and provide for automatic GPS fixes to be performed when a target, such as a golf cup, is moved to a new location, without requiring any human intervention on behalf of a golf course attendant. Additionally, present aspects provide for golf course information, such as course layout and the like, to be communicated via a wireless network, such as a cellular network, to the wireless device. In this regard, the golfer/user may obtain golf course information at any point in time prior to or during a round of golf, obviating the need to pre-load golf course information via a wired connection to a communication network.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for determining a distance to a golf cup on a golf course, the method comprising:
   receiving, at a wireless device, golf course information from a network device that stores current golf cup geographic location information;
   obtaining, by the wireless device, a wireless device geographic location;
   obtaining, by the wireless device, a golf cup geographic location related to one of a plurality of golf cups on the golf course from the golf course information, wherein a location determination procedure to determine the golf cup geographic location is triggered automatically based on an occurrence of an event, and wherein the golf cup geographic location determination is based, at least in part, on an asset tag maintained in proximity to the golf cup;
   obtaining, by the wireless device, the distance to the golf cup based on the wireless device geographic location and the golf cup geographic location; and
   presenting the distance to the golf cup on the wireless device.

2. The method of claim 1, wherein the event corresponds to sensing of a threshold level of motion associated with the golf cup.

3. The method of claim 1, wherein the event is time-based.

4. The method of claim 1, wherein the event corresponds to a remote trigger that triggers the location determination procedure remotely from the golf cup.

5. The method of claim 4, wherein the remote trigger corresponds to a user input to an input mechanism on the wireless device that prompts a wireless location determination request for the asset tag maintained in proximity to the golf cup.

6. The method of claim 1, wherein the golf cup geographic location and the wireless device geographic location are obtained at a substantially same point in time.

7. The method of claim 1, wherein the golf cup geographic location and the wireless device geographic location are determined such that both predicted locations have a substantially equivalent degree of inaccuracy.

8. The method of claim 1, wherein the golf course information includes the golf cup geographic location for the plurality of golf cups on the golf course.

9. The method of claim 8, wherein the receiving golf course information further comprises automatically receiving, at the wireless device, the golf course information that includes the golf cup geographic location for the plurality of golf cups on the golf course based on recognition of the wireless device being proximate to or at the golf course.

10. The method of claim 1, wherein obtaining the wireless device geographic location and the golf cup geographic location further comprises automatically obtaining the wireless device geographic location and the golf cup geographic location based on initiation of a golf course distance measuring application on the wireless device.

11. The method of claim 1, wherein obtaining the wireless device geographic location and the golf cup geographic location further comprises receiving a user input on a golf course distance measuring application executing on the wireless device to obtain the distance to the golf cup.

12. The method of claim 1, further comprising generating and transmitting a golf course information request resulting in obtaining the golf cup geographic location.

13. The method of claim 1, wherein obtaining the wireless device geographic location and the golf cup geographic location related to the one of the plurality of golf cups further comprises obtaining the golf cup geographic location by wirelessly communicating with the network device that stores current golf cup geographic location.

14. The method of claim 1, wherein obtaining the wireless device geographic location and the golf cup geographic location further comprises executing a Global Positioning System (GPS)-based location-determination mode comprising at least one of a Mobile Station (MS)-Based mode, a Mobile Station (MS)-Assisted mode, or a Standalone mode.

15. The method of claim 1, wherein obtaining the wireless device geographic location and the golf cup geographic location further comprises executing a Differential Global Positioning System (DGPS)-based location-determination mode.

16. The method of claim 1, wherein obtaining the wireless device geographic location and the golf cup geographic location further comprises executing a network-based location-determination mode comprising at least one of Advanced Forward Link Trilateration (AFLT) mode or Enhanced Observed Time Difference (E-OTD) mode.

17. The method of claim 1, wherein obtaining the distance to the golf cup based on the wireless device geographic location and the golf cup geographic location further comprises determining, at the wireless device, the distance to the golf cup based on the wireless device geographic location and the golf cup geographic location.

18. The method of claim 1, wherein obtaining the distance to the golf cup based on the wireless device geographic location and the golf cup geographic location further comprises communicating with a wireless network device to obtain the distance to the golf cup based on the wireless device geographic location and the golf cup geographic location.

19. The method of claim 1, wherein presenting the distance on the wireless device further comprises presenting the distance on an output mechanism chosen from the group of output mechanisms consisting of a display, a speaker and a Personal Area Network (PAN) transceiver.

20. The method of claim 1, further comprising obtaining a geographic location of one or more golf course targets, wherein the golf course targets are associated with the one of the plurality of golf cups.

21. The method of claim 20, further comprising generating and transmitting a golf course information request, and the receiving comprises receiving the golf course information corresponding to the golf course information request, wherein obtaining the geographic location of one or more golf course targets further comprises obtaining the geographic location of the one or more golf course targets from the golf course information.

22. The method of claim 20, further comprising obtaining a target distance to the one or more golf course targets based on the wireless device geographic location and the geographic location of the one more golf course targets.

23. The method of claim 22, further comprising presenting the target distance to the one or more golf course targets on the wireless device.

24. The method of claim 1, wherein presenting the distance to the golf cup on the wireless device further comprises presenting a first display that includes at least the distance to the golf cup and a golf course hole number associated with the golf cup and presenting a second display that includes at least an overview of a golf course hole layout associated with the golf cup and a target distance to one or more golf course targets.

25. The method of claim 1, wherein presenting the distance to the golf cup on the wireless device further comprises presenting a golf green presentation mode that includes a display of an overview of the golf green and the distance to the golf cup.

26. The method of claim 25, wherein presenting the golf green presentation mode further comprises presenting gradient markings on the overview of the golf green to indicate direction of green slope.

27. The method of claim 25, wherein presenting the golf green presentation mode further comprises presenting a golf cup location accuracy marking.

28. The method of claim 1, further comprising obtaining a distance of a previous golf shot based on obtaining and storing a previous wireless device geographic location associated with a previous golf shot and comparing the previous wireless device geographic location to a current wireless device geographic location.

29. The method of claim 28, further comprising presenting the distance of the previous golf shot on the wireless device.

30. The method of claim 1, further comprising obtaining an elevation gradient based on the wireless device geographic location and the golf cup geographic location, and presenting the elevation gradient on the wireless device.

31. The method of claim 1, further comprising obtaining at least one environmental parameter associated with current environmental conditions, and presenting the at least one environmental parameter on the wireless device in conjunction with the presenting of the distance to the golf cup.

32. The method of claim 31, wherein obtaining at least one environmental parameter further comprises obtaining at least one of temperature, humidity, wind speed, and wind direction.

33. The method of claim 1, further comprising determining a directional vector based on the wireless device geographic location and the golf cup geographic location, and displaying the directional vector on the wireless device along with a representation of additional target information associated with at least one of the wireless device geographic location and the golf cup geographic location.

34. The method of claim 1, further comprising communicating the distance to the golf cup to a remote assistance service, and receiving a golf swing advice communication from the remote assistance service.

35. The method of claim 34, further comprising obtaining at least one of an environmental parameter associated with current environmental conditions and an elevation gradient, and communicating the at least one of the environmental parameter and the elevation gradient to the remote assistance service.

36. The method of claim 1, further comprising communicating a golf score to a remote database operable for maintaining a golfer index.

37. At least one processor configured for determining golf cup distance on a golf course, the at least one processor comprising:
   a first module for receiving golf course information from a network device that stores current golf cup geographic location information;
   a second module for obtaining a wireless device geographic location;
   a third module for obtaining, from the golf course information, a golf cup geographic location related to one of a plurality of golf cups on the golf course, wherein a location determination procedure to determine the golf cup geographic location is triggered automatically based on an occurrence of an event, and wherein the golf cup geographic location determination is based, at least in part, on an asset tag maintained in proximity to the golf cup;
   a fourth module for obtaining a distance to the golf cup based on the wireless device geographic location and the golf cup geographic location; and
   a fifth module for presenting the distance to the golf cup on a wireless device.

38. A non-transitory computer-readable medium containing instructions stored thereon, which, when executed by a computer, cause the computer to perform operations, the instructions comprising:

at least one instruction for causing the computer to receive golf course information from a network device that stores current golf cup geographic location information;

at least one instruction for causing the computer to obtain a wireless device geographic location;

at least one instruction for causing the computer to obtain, from the golf course information, a golf cup geographic location related to one of a plurality of golf cups, wherein a location determination procedure to determine the golf cup geographic location is triggered automatically based on an occurrence of an event, and wherein the golf cup geographic location determination is based, at least in part, on an asset tag maintained in proximity to the golf cup;

at least one instruction for causing the computer to obtain a distance to the golf cup based on the wireless device geographic location and the golf cup geographic location; and at least one instruction for causing the computer to present the distance to the golf cup on a wireless device.

39. A wireless communication device, comprising:

means for receiving golf course information from a network device that stores current golf cup geographic location information;

means for obtaining a wireless device geographic location;

means for obtaining, from the golf course information, a golf cup geographic location related to one of a plurality of golf cups, wherein a location determination procedure to determine the golf cup geographic location is triggered automatically based on an occurrence of an event, and wherein the golf cup geographic location determination is based, at least in part, on an asset tag maintained in proximity to the golf cup;

means for obtaining a distance to the golf cup based on the wireless device geographic location and the golf cup geographic location; and means for presenting the distance to the golf cup on a wireless device.

40. A wireless device, comprising:

a computer platform including at least one processor and a memory; and a golf course distance measuring application stored in the memory and executable by the at least one processor, the golf course distance measuring application operable to receive golf course information from a network device that stores current golf cup geographic location information, obtain a wireless device geographic location, obtain, from the golf course information, a golf cup geographic location related to one of a plurality of golf cups, to obtain a distance to the one of the plurality of golf cups based on the wireless device geographic location and the golf cup geographic location, and to present the distance to the golf cup on the wireless device, wherein a location determination procedure to determine the golf cup geographic location is triggered automatically based on an occurrence of an event, and wherein the golf cup geographic location determination is based, at least in part, on an asset tag maintained in proximity to a golf cup.

41. The wireless device of claim 40, wherein the event comprises sensing of a threshold level of motion associated with the golf cup.

42. The wireless device of claim 40, wherein the event is time-based.

43. The wireless device of claim 40, wherein the event comprises a remote trigger that triggers the location determination procedure remotely from the golf cup.

44. The wireless device of claim 43, wherein the remote trigger comprises a user input to an input mechanism on the wireless device that prompts a wireless location determination request for the asset tag maintained in proximity to the golf cup.

45. The wireless device of claim 43, wherein the golf cup geographic location and the wireless device geographic location are determined at a substantially same point in time.

46. The wireless device of claim 43, wherein the golf cup geographic location and the wireless device geographic location have a substantially equivalent degree of inaccuracy.

47. The wireless device of claim 40, wherein the received golf course information includes the golf cup geographic location for the plurality of golf cups on the golf course.

48. The wireless device of claim 47, wherein the golf course distance measuring application is further operable to automatically receive golf course information comprising the golf cup geographic location when the wireless device is proximate or at the golf course.

49. The wireless device of claim 40, wherein the golf course distance measuring application is further operable to automatically obtain the wireless device geographic location and the golf cup geographic location based on an initiation of the golf course distance measuring application.

50. The wireless device of claim 40, wherein the golf course distance measuring application is further operable to receive a request to obtain the distance to the golf cup prior to obtaining the wireless device geographic location and the golf cup geographic location.

51. The wireless device of claim 40, wherein the golf course distance measuring application is further operable to obtain the golf cup geographic location by wirelessly communicating with a network device that stores current golf cup geographic location.

52. The wireless device of claim 40, wherein the golf course distance measuring application is further operable to obtain the wireless device geographic location by executing a Global Positioning System (GPS)-based location-determination mode comprising at least one of a Mobile Station (MS)-Based mode, a Mobile Station (MS)-Assisted mode, or a Standalone mode.

53. The wireless device of claim 40, wherein the golf course distance measuring application is further operable to obtain the wireless device geographic location by executing a Differential Global Positioning System (DGPS)-based location-determination mode.

54. The wireless device of claim 40, wherein the golf course distance measuring application is further operable to obtain the wireless device geographic location by executing a network based location-determination mode comprising at least one of Advanced Forward Link Trilateration (AFLT) mode or Enhanced-Observed Time Difference (E-OTD) mode.

55. The wireless device of claim 40, wherein the golf course distance measuring application is further operable to obtain the distance to the golf cup by determining a distance differential between the wireless device geographic location and the golf cup geographic location.

56. The wireless device of claim 40, wherein the golf course distance measuring application is further operable to obtain the distance to the golf cup by communicating with a wireless network device to obtain the distance to the golf cup.

57. The wireless device of claim 40, further comprising an output mechanism chosen from the group of output mechanisms consisting of a display, a speaker, and a Personal Area Network (PAN) transceiver, wherein the output mechanism is operable for presenting the distance to the golf cup.

58. The wireless device of claim 40, wherein the golf course distance measuring application is further operable to obtain a geographic location of one or more golf course targets, wherein the one or more golf course targets are associated with the one of the plurality of golf cups.

59. The wireless device of claim 58, wherein the memory further comprises golf course information comprising the golf cup geographic location and a respective target geographic location corresponding to the one or more golf course targets.

60. The wireless device of claim 58, wherein the golf course distance measuring application is further operable obtain a target distance to a respective one or more golf course targets based on the wireless device geographic location and a respective target geographic location of the one more golf course targets.

61. The wireless device of claim 60, wherein the golf course distance measuring application is further operable to present a respective target distance to the one or more golf course targets on the wireless device.

62. The wireless device of claim 60, further comprising a first display and a second display, wherein the golf course distance measuring application is further operable to present on the first display at least the distance to the golf cup and a golf course hole number associated with the golf cup on the first display, and wherein the golf course distance measuring application is further operable to present on the second display at least an overview of a golf course hole layout associated with the golf cup and a respective target distance to the one or more golf course targets.

63. The wireless device of claim 40, wherein the golf course distance measuring application is further operable to present a golf green presentation mode that includes a golf green representation and a distance to the golf cup.

64. The wireless device of claim 63, wherein in the golf green presentation mode, the golf course distance measuring application is further operable to present a gradient marking on the golf green representation, the gradient marking indicating direction of green slope.

65. The wireless device of claim 63, wherein in the golf green presentation mode, the golf course distance measuring application is further operable to present a golf cup location accuracy marking on the golf green presentation.

66. The wireless device of claim 40, wherein the golf course distance measuring application is further operable to obtain a distance of a previous golf shot based on obtaining and storing a previous wireless device geographic location associated with the previous golf shot and comparing the previous wireless device geographic location to a current wireless device geographic location.

67. The wireless device of claim 66, wherein the golf course distance measuring application is further operable to present the distance of the previous golf shot on the wireless device.

68. The wireless device of claim 40, wherein the golf course distance measuring application is further operable to obtain an elevation gradient based on the wireless device geographic location and the golf cup geographic position and present the elevation gradient on the wireless device.

69. The wireless device of claim 40, wherein the golf course distance measuring application is further operable to obtain at least one environmental parameter associated with current environmental conditions and present the at least one environmental parameter on the wireless device in conjunction with presentation of the distance to the golf cup.

70. The wireless device of claim 69, wherein the at least one environmental parameter comprises at least one of temperature, humidity, wind speed, and wind direction.

71. The wireless device of claim 40, wherein the golf course distance measuring application is further operable to determine a directional vector based on the wireless device geographic location and the golf cup geographic location and display the directional vector along with additional target information associated with at least one of the wireless device geographic location and the golf cup geographic location.

72. The wireless device of claim 40, further comprising a remote golf assistance application stored in the memory and executable by one or more processors, wherein the remote golf assistance application is operable to communicate the distance to the golf cup to a remote assistance service and receive a golf swing advice communication from the remote assistance service in response to communicating the distance to the golf cup.

73. The wireless device of claim 40, wherein the golf course distance measuring application is further operable to communicate a golf score to a network database operable to maintain a golfer index.

74. A method for obtaining current golf course cup geographic location at a network server, the method comprising:
receiving, from a location-determining entity, an initial golf cup geographic location for a golf cup at a golf course;
storing, in memory, the initial golf cup geographic location as a current golf cup location;
receiving, from the location-determining entity, an update to the initial golf cup geographic location based on an occurrence of an automatic event; and
storing, in memory, the update to the initial golf cup geographic location as the current golf cup location,
wherein a golf cup geographic location determination is based, at least in part, on an asset tag maintained in proximity to the golf cup.

75. The method of claim 74, wherein the automatic event corresponds to sensing a threshold level of motion in the golf cup.

76. The method of claim 74, wherein the automatic event is time-based.

77. The method of claim 74, wherein the automatic event corresponds to receipt of a remote trigger that is issued remotely from the golf cup.

78. The method of claim 77, wherein the remote trigger is a user input to an input mechanism on a wireless device that prompts a wireless location determination request for the asset tag maintained in proximity to the golf cup.

79. The method of claim 77, wherein the golf cup geographic location and the wireless device geographic location are determined at a substantially same point in time.

80. The method of claim 77, wherein the golf cup geographic location and the wireless device location are determined such that both predicted locations have a substantially equivalent degree of inaccuracy.

81. The method of claim 74, further comprising communicating, wirelessly, upon request, the current golf cup location to a wireless device.

82. The method of claim 81, wherein communicating, wirelessly, upon request, the current golf cup location to the wireless device further comprises communicating the current golf cup location in response to a request for information related to the golf course.

83. The method of claim 81, wherein communicating, wirelessly, upon request, the current golf cup location to the wireless device further comprises communicating the current golf cup location in response to a request for the current golf cup location based on initiation of a golf cup distance request by the wireless device.

84. The method of claim 74, wherein receiving, from a location-determining entity, an initial golf cup geographic location further comprises, receiving, from the location-determining entity, the initial golf cup location, wherein the location-determining entity determines the initial golf cup location by executing a Mobile Station (MS)-Assisted Global Positioning System (GPS)-based location-determination routine.

85. The method of claim 74, wherein receiving, from a location-determining entity, an initial golf cup geographic location further comprises, receiving, from the location-determining entity, the initial golf cup location, wherein the location-determining entity determines the initial golf cup location by executing a Differential Global Positioning System (DGPS)-based location-determination routine.

86. The method of claim 74, further comprising receiving a current wireless device geographic location from a wireless device, determining a distance to the golf cup based on the current wireless device geographic location and the current golf cup geographic location and communicating the distance to the golf cup to the wireless device.

87. The method of claim 74, further comprising receiving, from the location-determining entity, a geographic location for one or more targets associated with the golf cup and storing, in the memory, the geographic locations for the one or more targets.

88. The method of claim 87, further comprising communicating, wirelessly, upon request, the geographic location of the one or more targets.

89. The method of claim 87, further comprising receiving a current wireless device geographic location from a wireless device, determining a distance to the one or more targets based on the current wireless device geographic location and the geographic location of the one or more targets and communicating the distance to the one or more targets to the wireless device.

90. At least one processor configured for obtaining current golf course cup geographic location at a network server, the at least one processor comprising:
  a first module for receiving, from a location-determining entity, an initial golf cup geographic location for a golf cup at a golf course;
  a second module for storing, in memory, the initial golf cup geographic location as a current golf cup location;
  a third module for receiving, from the location-determining entity, an update to the initial golf cup geographic location based on an occurrence of an automatic event; and
  a fourth module for storing, in memory, the update to the initial golf cup geographic location as the current golf cup location,
  wherein a golf cup geographic location determination is based, at least in part, on an asset tag maintained in proximity to the golf cup.

91. A non-transitory computer-readable medium containing instructions stored thereon, which, when executed by a computer, cause the computer to perform operations, the instructions comprising:
  at least one instruction for causing the computer to receive, from a location-determining entity, an initial golf cup geographic location for a golf cup at a golf course;
  at least one instruction for causing the computer to store, in memory, the initial golf cup geographic location as a current golf cup location;
  at least one instruction for causing the computer to receive, from the location-determining entity, an update to the initial golf cup geographic location based on an occurrence of an automatic event; and
  at least one instruction for causing the computer to store, in memory, the update to the initial golf cup geographic location as the current golf cup location,
  wherein a golf cup geographic location determination is based, at least in part, on an asset tag maintained in proximity to the golf cup.

92. A network device, comprising:
  means for receiving, from a location-determining entity, an initial golf cup geographic location for a golf cup at a golf course;
  means for storing, in memory, the initial golf cup geographic location as a current golf cup location;
  means for receiving, from the location-determining entity, an update to the initial golf cup geographic location based on an occurrence of an automatic event; and
  means for storing, in memory, the update to the initial golf cup geographic location as the current golf cup location,
  wherein a golf cup geographic location determination is based, at least in part, on an asset tag maintained in proximity to the golf cup.

93. A network device, comprising:
  a computer platform including at least one processor and a memory; and
  a golf course target location and distance application stored in the memory and executable by the at least one processor, wherein the application is operable to receive, from a location-determining entity, an initial golf cup geographic location for a golf cup at a golf course, store, in the memory, the initial golf cup geographic location as a current golf cup location, receive, from the location-determining entity, an update to the initial golf cup geographic location based on an occurrence of an automatic event and store, in memory, the update to the initial golf cup geographic location as the current golf cup location,
  wherein a golf cup geographic location determination is based, at least in part, on an asset tag maintained in proximity to the golf cup.

94. The network device of claim 93, wherein the automatic event corresponds to sensing a threshold level of motion in the golf cup.

95. The network device of claim 93, wherein the automatic event is time-based.

96. The network device of claim 93, wherein the automatic event corresponds to receipt of a remote trigger that is issued remotely from the golf cup by a positioning determining entity.

97. The network device of claim 96, wherein the golf course target location and distance application is further operable to receive a wireless device location.

98. The network device of claim 97, wherein the update to the initial golf cup geographic location and the wireless device location are determined at a substantially same point in time.

99. The network device of claim 97, wherein the update to the initial golf cup geographic location and the wireless device location have a substantially equivalent degree of inaccuracy.

100. The network device of claim 93, further comprising a communications module operable to communicate, wirelessly, upon request, the current golf cup location to a wireless device.

101. The network device of claim 100, wherein the communications module is further operable to communicate the current golf cup location in response to a request for information related to the golf course.

102. The network device of claim 100, wherein the communications module is further operable to communicate the current golf cup location in response to a request for the current golf cup location based on initiation of a golf cup distance request by the wireless device.

103. The network device of claim 93, wherein the location-determining entity is external to the network device.

104. The network device of claim 93, wherein the network device includes the location-determining entity.

105. The network device of claim 93, wherein the location-determining entity determines the initial golf cup geographic location by executing a Mobile Station (MS)-Assisted Global Positioning System (GPS)-based location-determination routine.

106. The network device of claim 93, wherein the location-determining entity determines the initial golf cup geographic location by executing a Differential Global Positioning System (DGPS)-based location-determination routine.

107. The network device of claim 93, wherein the location-determining entity determines the initial golf cup geographic location by executing a network-based Advanced Forward Link Trilateration (AFLT) location-determination routine.

108. The network device of claim 93, wherein the golf course target location and distance application is further operable to determine a distance to the golf cup based on the current wireless device geographic location and the current golf cup geographic location and communicate the distance to the cup to the wireless device.

109. The network device of claim 93, wherein the golf course target location and distance application is further operable to receive, from the location-determining entity, geographic locations for one or more targets associated with the golf cup and store, in the memory, the geographic locations for the one or more targets.

110. The network device of claim 109, wherein the golf course target location and distance application is further operable to receive a current wireless device geographic location from a wireless device, determine a distance to the one or more targets based on the current wireless device geographic location and the geographic location of the one or more targets and communicating the distance to the one or more targets to the wireless device.

111. A system for determining the distance to a golf cup on a golf course, the system comprising:
a plurality of asset tags, each asset tag located proximate to a golf cup on a golf course, wherein each of the plurality of asset tags are operable to initiate a determination of a golf cup geographic location based on an occurrence of an automatic event;
a network device including a golf course target location and distance application operable to receive, from a location-determining entity, a golf cup geographic location, store the golf cup geographic location as a current golf cup location, receive, from the location-determining entity, an update to the golf cup geographic location based on the occurrence of the automatic event, store, in memory, the update to the golf cup geographic location as the current golf cup location and communicate the current golf cup location; and
a wireless communication device including a golf course distance measuring application operable to wirelessly receive the current golf cup geographic location, receive a request to obtain a distance to the golf cup, obtain a wireless device geographic location based on the request, obtain the distance to the golf cup based on the wireless device geographic location and the golf cup geographic location and present the distance to the golf cup on the wireless device.

112. The system of claim 111, wherein the plurality of asset tags further comprise a motion sensor, wherein the automatic event corresponds to sensing a threshold level of motion in the motion sensor.

113. The system of claim 111, wherein the plurality of asset tags further comprise a clock mechanism, wherein the automatic event is time-based and is based on an operation of the clock mechanism.

114. The system of claim 111, wherein the plurality of asset tags further comprise a transceiver, wherein the transceiver is operable to receive a location determination prompt that triggers asset tag location determination at a substantially same point in time as a location determination of the wireless communication device.

115. The system of claim 111, wherein the plurality of asset tags are affixed to a flagstick associated with the golf cup.

116. The system of claim 111, wherein the plurality of asset tags are affixed to the golf cup.

117. A method for determining a distance to a target, the method comprising:
receiving, at a wireless device, target information from a network device that stores current target geographic location information;
obtaining, by the wireless device, a wireless device geographic location;
obtaining, by the wireless device, a target geographic location from the target information, wherein the target comprises an asset tag, and a location determination procedure to determine the target geographic location is triggered automatically based on an occurrence of an event;
obtaining, by the wireless device, a distance to the target based on the wireless device geographic location and the target geographic location; and
presenting the distance to the target on the wireless device.

118. The method of claim 117, wherein the event corresponds to sensing of a threshold level of motion associated with the target.

119. The method of claim 117, wherein the event is time-based.

120. The method of claim 117, wherein the event corresponds to a remote trigger that triggers the location determination procedure remotely from the golf cup.

121. A wireless device, comprising:
a computer platform including at least one processor and a memory; and
a target distance measuring application stored in the memory and executable by the at least one processor, the target distance measuring application operable to receive target information from a network device that stores current target geographic location information, obtain a wireless device geographic location, obtain, from the target geographic location information, a target geographic location, to obtain a distance to the target based on the wireless device geographic location and the target geographic location, and to present the distance to the target on the wireless device, wherein the target comprises an asset tag and a location determination procedure to determine the target geographic location is triggered automatically based on an occurrence of an event.

122. The device of claim 121, wherein the event comprises sensing of a threshold level of motion associated with the target.

123. The device of claim 121, wherein the event is time-based.

124. The device of claim 121, wherein the event comprises a remote trigger that triggers the location determination procedure remotely from the golf cup.

* * * * *